(12) United States Patent
Tang

(10) Patent No.: US 11,877,182 B2
(45) Date of Patent: Jan. 16, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 220 days.

(21) Appl. No.: 17/340,872

(22) Filed: Jun. 7, 2021

(65) Prior Publication Data

US 2021/0297901 A1 Sep. 23, 2021

Related U.S. Application Data

(63) Continuation of application No. PCT/CN2019/082780, filed on Apr. 15, 2019.

(30) Foreign Application Priority Data

Dec. 11, 2018 (WO) ................ PCT/CN2018/120292
Jan. 18, 2019 (WO) ................ PCT/CN2019/072345

(51) Int. Cl.
*H04W 4/00* (2018.01)
*H04W 28/06* (2009.01)
(Continued)

(52) U.S. Cl.
CPC ........... *H04W 28/06* (2013.01); *H04L 1/1819* (2013.01); *H04L 1/1896* (2013.01);
(Continued)

(58) Field of Classification Search
USPC .................................................. 370/329, 330
See application file for complete search history.

(56) References Cited

U.S. PATENT DOCUMENTS

| 2018/0279168 A1 | 9/2018 | Jheng et al. |
| 2018/0309660 A1 | 10/2018 | Loehr et al. |

(Continued)

FOREIGN PATENT DOCUMENTS

| CN | 106465315 A | 2/2017 |
| CN | 107078871 A | 8/2017 |

(Continued)

OTHER PUBLICATIONS

The EESR of corresponding European application No. 19896571.7, dated Nov. 25, 2021.

(Continued)

*Primary Examiner* — Chuong T Ho
(74) *Attorney, Agent, or Firm* — Ladas & Parry LLP

(57) ABSTRACT

Embodiments of the present application provide a wireless communication method, a terminal device and a network device, in a scenario where CA and DC are combined, one PDCP entity may use more than two RLC entities to transmit a duplication, thus avoiding using all RLC entities to transmit the duplication during the activation, reducing a waste of resources in the duplication transmission scenario, improving system resource utilization, and ensuring the transmission performance of services such as a URLLC service while ensuring the overall transmission performance of the system. The wireless communication method is applied to a scenario where CA and DC are combined, and includes: in a case where a first condition is met, determining, by a terminal device, whether to perform a duplication transmission, and/or, determining, by the terminal device, whether to trigger a duplication transmission.

11 Claims, 4 Drawing Sheets

(51) Int. Cl.
  *H04W 76/15* (2018.01)
  *H04L 1/1812* (2023.01)
  *H04L 1/1867* (2023.01)
  *H04W 28/02* (2009.01)
  *H04W 80/02* (2009.01)

(52) U.S. Cl.
  CPC ....... *H04W 28/0268* (2013.01); *H04W 76/15* (2018.02); *H04W 80/02* (2013.01)

(56) References Cited

U.S. PATENT DOCUMENTS

| | | | | |
|---|---|---|---|---|
| 2018/0324641 | A1* | 11/2018 | Tsai | H04W 72/04 |
| 2020/0119976 | A1* | 4/2020 | Xu | H04W 24/02 |
| 2020/0162366 | A1* | 5/2020 | Vrzic | H04L 45/16 |
| 2021/0006954 | A1* | 1/2021 | Xu | H04W 64/00 |
| 2021/0126746 | A1* | 4/2021 | Li | H04W 76/15 |
| 2021/0152296 | A1* | 5/2021 | Chen | H04W 80/02 |

FOREIGN PATENT DOCUMENTS

| | | | |
|---|---|---|---|
| CN | 108401484 | A | 8/2018 |
| CN | 108810990 | A | 11/2018 |
| CN | 108811175 | A | 11/2018 |
| WO | 2017191952 | A1 | 11/2017 |
| WO | 2018059557 | A1 | 4/2018 |
| WO | 2018200565 | A1 | 11/2018 |
| WO | 2018202198 | A1 | 11/2018 |

OTHER PUBLICATIONS

The second Office Action of corresponding European application No. 19896571.7, dated Jan. 26, 2023.

The First Office Action of corresponding European application No. 19896571.7, dated Aug. 4, 2022.

International Search Report (ISR) dated Sep. 27, 2019 for Application No. PCT/CN2019/082780.

Huawei, Hisilicon. "Activating and Deactivating Packet Duplication, R2-1703529" 3GPP TSG-RAN2 #97bis Spokane, Washington, USA, Apr. 7, 2017(Apr. 7, 2017), part 2.

International Search Report (ISR) dated May 29, 2019 for Application No. PCT/CN2018/120292.

LG Electronics Inc. "Packet duplication with implicit SCell deactivation and BWP switching." 3GPP TSG-RAN WG2 NR Ad Hoc #3. R2-1801281, Jan. 12, 2018(Jan. 12, 2018), entire document.

International Search Report (ISR) dated Sep. 9, 2019 for Application No. PCT/CN2019/072345.

Nokia et al. "Resource Efficient PDCP Duplication", 3GPP TSG-RAN WG2 Meeting #104 R2-1817582, Nov. 16, 2018(Nov. 16, 2018), section 1 and 2.3.

3GPP TS 38.321 V16.5.0 (Jun. 2021); 3rd Generation Partnership Project; Technical Specification Group Radio Access Network: NR; Medium Access Control (MAC) protocol specification(Release 16).

3GPP TS 38.323 V16.4.0 (Jun. 2021); 3rd Generation Partnership Project; Technical Specification Group Radio Access Network; NR; Packet Data Convergence Protocol (PDCP) specification(Release 16).

The first Office Action of corresponding Chinese application No. 202210158570.8, dated Mar. 11, 2023.

The second Office Action of corresponding Chinese application No. 202210158570.8, dated May 26, 2023.

The Notice of Rejection of corresponding Chinese application No. 202210158570.8, dated Aug. 8, 2023.

The third Office Action of corresponding European application No. 19896571.7, dated Jul. 20, 2023.

* cited by examiner

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2019/082780 filed on Apr. 15, 2019 which claims priority to PCT Patent Application No. PCT/CN2018/120292, entitled "Wireless Communication Method, Terminal device and Network Device", filed with the China National intellectual Property Administration on Dec. 11, 2018 and PCT Patent Application No. PCT/CN20.19/0723415, entitled "Wireless Communication Method, Terminal device and Network Device", filed with the China National Intellectual Property Administration on Jan. 18, 2019. All of the above applications are hereby incorporated by reference in their entireties.

TECHNICAL FIELD

Embodiments of the present application relate to the field of communication technologies and, in particular, to a wireless communication method, a terminal device and a network device.

BACKGROUND

In Release 15 (Rel-15), the data duplication function is introduced to improve the transmission reliability of Ultra-Reliable and Low Latency Communication (URLLC) services. Specifically, carrier aggregation (CA) or dual connection (DC) can be used to realize a transmission of duplication. In Release 16 (Rel-16), a Packet Data Convergence Protocol (PDCP) entity is introduced, which can use a way of transmitting a duplication through more than two radio link control (RLC) entities. Specifically, it can be realized by a combination of CA and DC. At this time, if an activation or deactivation method for an RLC entity in the Rel-15 is still used, all Rif entities will be caused to transmit the duplication during the activation, thus resulting, in a certain waste of resources and system performance degradation. In addition, the method of duplication transmission for a bearer may occupy unnecessary transmission resources, thereby resulting in a waste of resources and system performance degradation.

SUMMARY

Embodiments of the present application provide a wireless communication method, a terminal device and a network device, in a scenario where CA and DC are combined, one PDCP entity may use more than two RLC entities to transmit a duplication, thus avoiding using all RLC entities to transmit the duplication during the activation, reducing a waste of resources in the duplication transmission scenario, improving system resource utilization, and ensuring the transmission performance of services such as a URLLC service while ensuring the overall transmission performance of the system.

In an implementation, the present application may also be applied to a scenario where more than two RIX entities of more than two MAC entities or cell groups transmit a duplication, and may also be applied to a scenario where more than two RIX': entities of the same MAC entity or cell group transmit a duplication.

In an implementation, the present application may also be applied to a scenario where one bearer corresponds to at least one PDCP entity.

In a first aspect, there is provided a wireless communication method, applied to a scenario where CA and DC are combined, including:
  in a case where a first condition is met, determining, by a terminal device, whether to perform a duplication transmission, and/or, determining, by the terminal device, whether to trigger a duplication transmission.

In an implementation, a granularity of the duplication transmission is any one of per UE, per service, per bearer, per QoS flow, and per data packet, or any one of at least one bearer, at least one data packet, at least one service, at least one QoS flow, and at least one UE.

In an implementation, the duplication ay be data in a URLLC service.

In some possible implementations, the method further includes:
  in a case where the terminal device determines to perform the duplication transmission, transmitting, by a PDCP entity of the terminal device, a data packet that triggers the duplication transmission to at least one RLC entity: and/or,
  in a case where the terminal device determines to perform the duplication transmission, performing, by at least one RLC entity among PDCP entities corresponding to the terminal device, data transmission and/or reception of a data packet that triggers the duplication transmission.

In a second aspect, there is provided a wireless communication method, applied to a scenario where CA and DC are combined, including:
  receiving, by a network device, second information, where the second information is used for indicating a change of data duplication status or a duplication transmission behavior of a peer end.

It should be noted that the peer end may be a device that communicates with the network device, for example, a terminal device.

In an implementation, a granularity of a duplication transmission is any one of per UE, per hearer, per QoS flow, and per data packet.

In an implementation, a data duplication of the peer end may be a data duplication for a URLLC service.

In a third aspect, there is provided a terminal device for performing the method according to the first aspect or the method in various implementation manners according to the first aspect.

Specifically, the terminal device includes a functional module for performing the method according to the first aspect or the method in various implementation manners according to the first aspect.

In a fourth aspect, there is provided a network device for performing the method according to the second aspect or the method in various implementation manners according to the second aspect.

Specifically, the network device includes a functional module liar performing the method according to the second aspect or the method in various implementation manners according to the second aspect.

In a fifth aspect, there is provided a terminal device including a processor and a memory. The memory is configured to store a computer program, and the processor is configured to call and run the computer program stored in the memory to perform the method according to the first aspect or the method in various implementation manners according to the first aspect.

In a sixth aspect, there is provided a network device including a processor and a memory. The memory is configured to store a computer program, and the processor is configured to call and run the computer program stored in the memory to perform the method according to the second aspect or the method in various implementation manners according to the second aspect.

In a seventh aspect, there is provided a chip for implementing the method in any one of the first aspect and the second aspect or the method in various implementation manners according to the first aspect and the second aspect.

Specifically, the chip includes a processor for calling and running a computer program from a memory, so that the device installed with the chip executes the method in any one of the first aspect and the second aspect or the method in various implementation manners according to the first aspect and the second aspect.

In an eighth aspect, there is provided a computer-readable storage medium for storing a computer program that causes a computer to execute the method in any one of the first aspect and the second aspect or the method in various implementation manners according to the first aspect and the second aspect.

In a ninth aspect, there is provided a computer program product including a computer program instruction that cause a computer to perform the method in any one of the first aspect and the second aspect or the method in various implementation manners according to the first aspect and the second aspect.

In a tenth aspect, there is provided a computer program that, when run on a computer, causes the computer to perform the method in any one of the first aspect and the second aspect or the method in various implementation manners according to the first aspect and the second aspect.

Through the above technical solution, in a scenario where CA and DC are combined, in a case where a first condition is met, a terminal device determines whether to perform a duplication transmission, and/or, the terminal device determines whether to trigger a duplication transmission. Furthermore, in a case where the terminal device determines to perform the replication data transmission, a PDCP entity of the terminal device transmits a data packet that triggers the duplication transmission to at least one RLC entity, and/or at least one RLC entity among PDCP entities corresponding to the terminal device performs data transmission and/or reception of a data packet that triggers the duplication transmission, so that one PDCP entity may use at least one RLC entity to transmit the duplication, and/or, adopt methods for data duplication and/or duplication transmission with different granularities, thus avoiding using all RLC entities to transmit the duplication during the activation, reducing a waste of resources in the duplication transmission scenario, improving system resource utilization, and ensuring the transmission performance of services such as a. URLLC service while ensuring the overall transmission performance of the system.

DESCRIPTION OF EMBODIMENTS

The technical solution in embodiments of the present application will be described below with reference to the accompanying drawings, Apparently, the described embodiments are merely a part rather than all embodiments of the present application. All other embodiments obtained by persons of ordinary skill in the art based on embodiments in the present application without paying creative labor shall fall within the protection scope of the present application.

The technical solutions of embodiments of the present application can be applied to various communication systems, such as a global system of mobile communication (GSM) system, a code division multiple access (CDMA) system, a wideband code division multiple access (WCDMA) system, general packet radio service (GPRS), a long term evolution (LIE) system, an advanced long term evolution (LIE-A) system, a new radio (NR) system, an advanced system of a NR system, an LIE-based access to unlicensed spectrum (LTE-U) system, a NR-based access to unlicensed spectrum (NR-U) system, a universal mobile telecommunication system (UNITS), a wireless local area network (WLAN), a wireless fidelity (WiFi) system, a next generation communication system, and the like.

In general, a limited number of connections are supported by traditional communication systems and are easy to implement. However, with the development of communication technology, mobile communication systems will not only support traditional communication, but should also support, for example, device to device (D2D) communication, machine to machine (M2M) communication, machine type communication (MTC), and vehicle to vehicle (V2V) communication, etc. Embodiments of the present application can also be applied to these communication systems.

In an implementation, a communication system in an embodiment of the present application can be applied to a carrier aggregation (CA) scenario, can also be applied to a dual connectivity (DC) scenario, and can also be applied to a standalone (SA) network deployment scenario.

Embodiments of the present application does not limit the applied frequency spectrum. For example, the embodiments of the present application can be applied to a licensed spectrum or an unlicensed spectrum.

Figure 1:
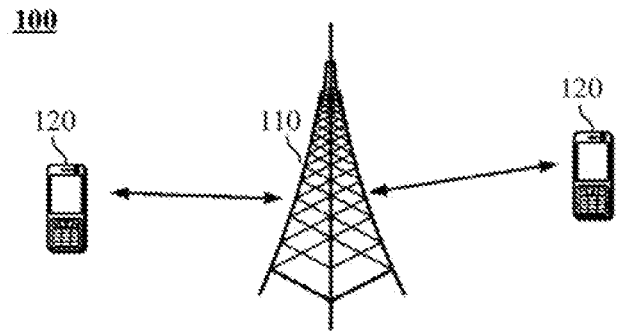
FIG. 1 is a schematic diagram of a communication system architecture provided by an embodiment of the present application.

Exemplarily, a communication system 100 applied in the embodiment of the present application is shown in FIG. 1.

The communication system 100 may include a network device 110, which may be a device that communicates with a terminal device 120 for referred to as a communication terminal, a terminal). The network device 110 can provide communication coverage for a specific geographical area, and can communicate with the terminal device located in the coverage area.

FIG. 1 exemplarily shows one network device and two terminal devices. In an implementation, the communication system 100 may include a plurality of network devices and other number of terminal devices may be included in the coverage area of each network device, which is not limited by the embodiment of the present application.

In an implementation, the communication system 100 may further include other network entities such as a network controller, a mobility management entity, etc., which is not limited by the embodiment of the present application.

It should be understood that devices with communication functions in the network system in the embodiment of the present application may be referred to as communication devices. Taking the communication system 100 shown in FIG. 1 as an example, the communication device may include a network device 110 and a terminal device 120 with communication functions, and the network device 110 and the terminal device 120 may be the specific devices described above and will not be described in detail herein. The communication device may also include other devices in the communication system 100, such as network controllers, mobility management entities and other network entities, which are not limited in the embodiment of the present application.

Various embodiments of the present application are described by combining a terminal device with a network device, where the terminal device (user equipment, UE) may also be referred to as a user device, an access terminal, a subscriber unit, a subscriber station, a mobile station, a mobile unit, a remote station, a remote terminal, a mobile device, a user terminal a terminal, a wireless communication device, a user agent or a user apparatus, etc. The terminal device may be a station (ST) in a MAN, which may be a cellular phone, a cordless phone, a session initiation protocol (SIP) phone, a wireless local loop (WLL) station, a personal digital assistant (PDA), a handheld device with wireless communication functions, a computing device or other processing device connected to a wireless modem, a vehicle-mounted device, a wearable device, a terminal device in a next generation communication network. (such as a NR network) or a terminal device in a future evolved public land mobile network (PLMN), etc.

As an example rather than a limitation, in an embodiment of the present application, a terminal device may also be a wearable device. The wearable device may also be referred as a wearable smart device, which is a general term far wearable devices which are intelligently designed and developed by applying wearable technologies on daily wears, such as glasses, gloves, watches, clothing and shoes. The wearable device is a portable device which may be directly worn on the body or integrated into clothes or an accessory of a user. The wearable device is not only a hardware device, but can also realize powerful functions by virtue of software support, data interaction, and cloud interaction. Generalized wearable smart devices include full-featured and large-sized devices, on which complete or partial functions can be achieved without relying on smart phones, such as smart watches or smart glasses, and also include devices which simply focus on a certain type of applications and need to cooperate with another devices (e.g. smart phones), such as various smart bracelets and smart jewelry for vital sign monitoring.

The network device may be a device which can communicate with the terminal device, and the network device may be an access point (AP) in a MAN, a base transceiver station (BTS) in GSM or CDMA, a NodeB (NB) in WCDMA, or an evolutional NodeB (eNB or eNodeB) in LTE, or a relay station, an access point, or a vehicle-mounted device, a wearable device, a network device (eNB) in a NR network or a network device in a future evolved PLMN, etc.

In the embodiments of the present application, the network device provides service for a cell, and the terminal device communicates with the network device through a transmission resource (e.g., a frequency domain resource, or a spectrum resource) used by the cell. The cell may be a cell corresponding to the network device (e.g. a base station), and the cell may belong to a macro base station or a base station corresponding to a small cell, where such small cell may include: a metro cell, a micro cell, a pica cell, a femto cell, etc., and such small cell has the characteristics of small coverage and low transmission power, which is suitable for providing high-speed data transmission services.

It should be understood that, in a CA scenario, the solution supporting data duplication transmission (data duplication) utilizes a PDCP duplication function in such a way that a duplicated PDCP protocol data unit (PDU) is transmitted to two RLC entities (two different logical channels) respectively, and finally ensuring that the duplicated PDCP PDU can be transmitted on aggregated carriers of different physical layers, so as a frequency diversity gain can be achieved to improve data transmission reliability. In a DC scenario, the solution supporting data duplication transmission (data duplication) utilizes the PDCP duplication function in such a way that the duplicated PDCP PDU is transmitted to two RLC entities respectively, where the two RLC entities correspond to different MAC entities.

Figure 2:
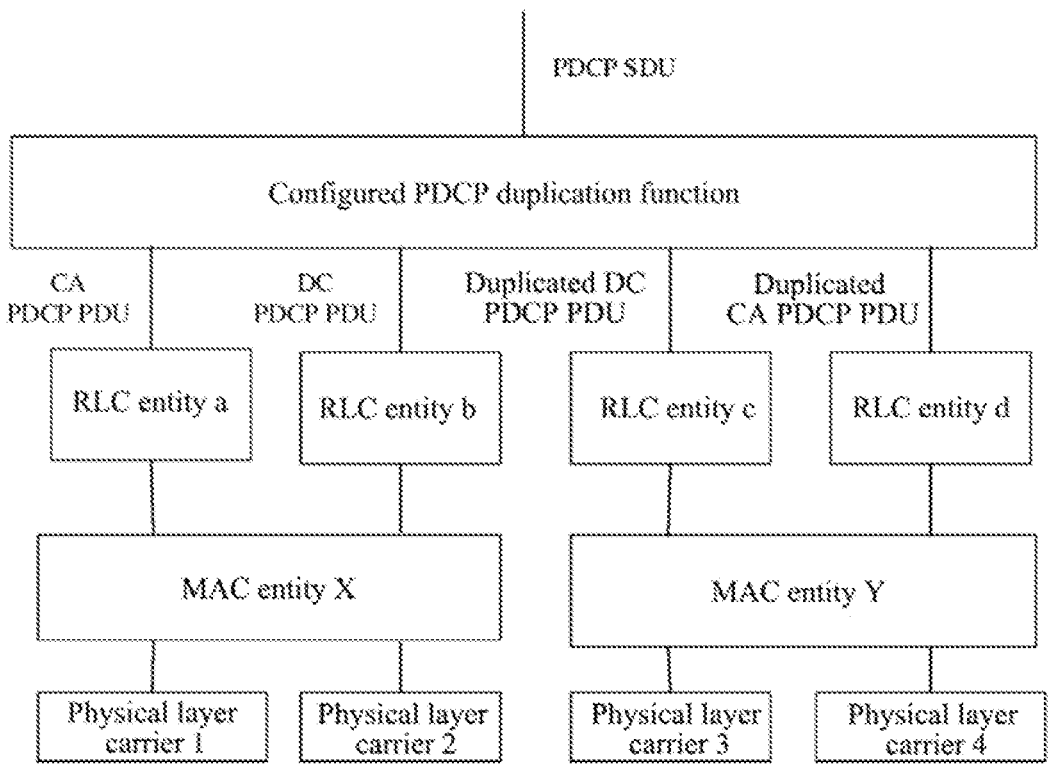
FIG. 2 is a schematic diagram of implementing a transmission of duplication by a combination of CA and DC according to an embodiment of the present application.

In Rel-16, a transmission of duplicated data (duplication) may be realized by a combination of CA and DC. As shown in FIG. 2, for a PDCP service data unit (SDU), in the CA scenario, by using a configured PDCP duplication function, it enables a CA PDCP PDU to be transmitted to an RLC entity a, and a duplicated CA PDCP PDU is transmitted to an RLC entity in the DC scenario, by using the configured. PDCP duplication function, it enables a DC PDCP PDU to be transmitted to an RLC entity h, and a duplicated DC PDCP PDU is transmitted to an RLC entity c. Furthermore, the RLC entity a and the RLC entity b are mapped to a media access control (MAC) entity X, the RLC entity c and the RLC entity d are mapped to a MAC entity Y. and the MAC entity X is mapped to a physical layer carrier 1 and a physical Layer carrier 2, the MAC entity Y is mapped to a physical layer carrier 3 and a physical layer carrier 4. However, if activation or deactivation for an RLC entity is performed as a way specified in the Rel-15 at this time, all RLC entities will be caused to transmit the duplication during activation, that is, the RLC entity a, the RLC entity b, the RLC entity r, and the RLC entity d transmit the duplication at the same time, in fact, only part of the RLC entities are required to transmit the duplication, which causes a certain waste of resources and system performance degradation. In addition, the method of duplication transmission for a bearer may occupy unnecessary transmission resources, resulting in a waste of resources and system performance degradation. Based on the foregoing technical problems, an embodiment of the present application proposes a solution for activating and deactivating duplication in a multiple PDCP duplication scenario.

It should be noted that, in FIG. 2 above, the configured PDCP duplication function may be configured based on a data radio bearer (DRB).

Figure 3:
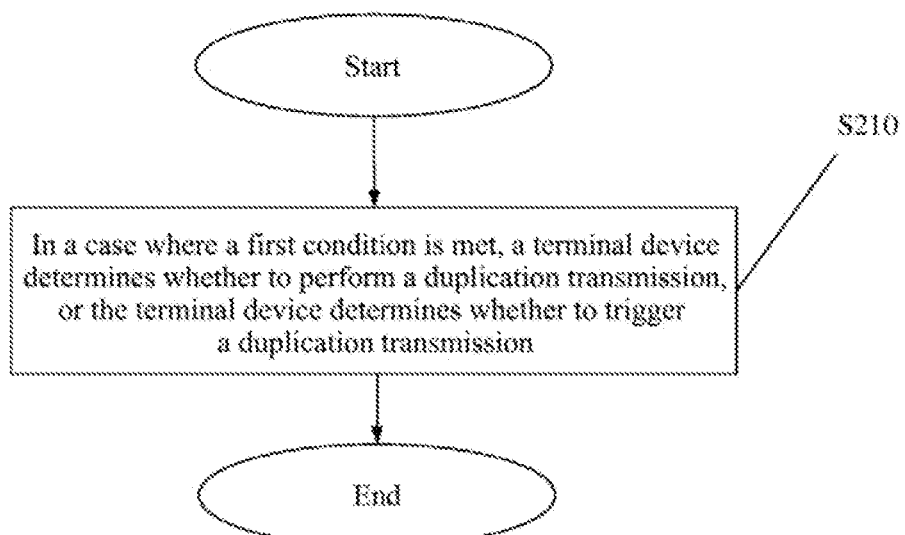
FIG. 3 is a schematic flowchart of a wireless communication method according to an embodiment of the present application.

FIG. 3 is a schematic flowchart of a wireless communication method 200 according to an embodiment of the present application. The method 200 may be applied to the communication system 100 shown in FIG. 1 and applied to the scenario where CA and DC are combined as shown in FIG. 2. Specifically, as shown in FIG. 3, the method 200 may include the following contents:

S210: in a case where a first condition is met, a terminal device determines whether to perform a duplication transmission, or the terminal device determines whether to trigger a duplication transmission.

In an implementation, in an embodiment of the present application, the terminal device determines the first condition and/or a judgment factor included in the first condition according to first information, among them, the first information includes but is not limited to at least one of the following information: a reference signal, a number of hybrid automatic repeat request (HARQ) retransmissions, a number of automatic repeat request (ARQ) retransmissions, a measurement object, synchronization status, a duplication object, a threshold, a service type, service status, service information to be transmitted, a trigger condition, and a judgment object.

In an implementation, in an embodiment of the present application, the terminal device determines the first condition and/or a judgment factor included in the first condition according to first information, among them, the first information includes but is not limited to at least one of the following information: a reference signal, a number of HARQ retransmissions, a number of ARQ retransmissions, a measurement object, synchronization status, a duplication object, a threshold, a service type, service status, service information to be transmitted, a trigger condition, a judgment object, a priority, a channel quality, an identifier of a logical channel, a type of a logical channel, a mode of an RLC entity, an identifier of a bearer, an identifier of a carrier, an identifier of an RLC entity, an identifier of a MAC entity, and a transmission quality.

In an implementation, a part of or all information included in the first information is configured or instructed by a network device; and/or, a part of or all information included in the first information is the first condition or a first factor or a first rule.

In an implementation, the part of or all information included in the first information is related information about a current cell or a beam, and/or related information about a current cell or a beam of a neighboring cell or a configured cell).

In an implementation, the duplication object includes but is not limited to one of bearer, a data packet, a service, a quality of service (QoS) flow, and a terminal device (UE).

It should be understood that the duplication object may be for a single bearer or for each bearer; similarly, the duplication object may be for a single data packet or for each data packet: the duplication object may be for a single service or for each service; the duplication object may be for a single QoS flow or for each. QoS flow.

It should be noted that a PDCP layer can receive information from a higher layer to indicate 5G QoS indicator (5QI) information and/or. QoS flow information and/or service information corresponding to the data packet.

In an implementation, the reference signal includes but is not limited to at least one of the following: a synchronization signal block (SSB), a channel state information reference signal (CSI-RS), and a sounding reference signal (SRS).

It should be noted that the SSB may also be referred to as a synchronization signal/physical broadcast channel block (SS/PBCH block).

In an implementation, the measurement object includes but is not limited to at least one of the following: a reference signal receiving power (RSRP), a reference signal receiving quality (RSRQ), a received signal strength indicator (RSSI), and a signal to interference plus noise ratio (SINR).

In an implementation, the synchronization status includes in-sync and out-of-sync.

In an implementation, the service type includes but is not limited to at least one of the following: a URLLC service, an industrial Internet of Things service, an Internet of Vehicles service, a time-sensitive network carried service, a vertical industry service, and an enhanced mobile ultra-broadband (eMBB) service.

For example, the trigger condition may be start or end of a first service. For another example, the trigger condition may be a change of a pattern of the first service. For another example, the trigger condition may also periodic trigger. The first service May be one of a URLLC service, an industrial Internet of Things service, an. Internet of Vehicles service, a time-sensitive network carried service, and a vertical industry service.

For example, when the judgment factors included in the first condition are a reference signal, a measurement object, a duplication object, and a threshold, and when the terminal device measures a CSI-RS, the measurement object is a RSRP, and the duplication object is a data packet, if an obtained value of the RSRP is greater than the threshold value 1, or the RSRP is greater than the threshold value 1 for a time duration, the terminal device determines to active a duplication transmission for this data packet.

For another example, when the judgment factors included in the first condition are a reference signal, a duplication object, and a threshold, and when the terminal device measures a SRS, and the duplication object is a service, if an obtained value of SRS is greater than the threshold 2, or if an average value of the SRS within a time duration is greater than the threshold 2, the terminal device determines to active a duplication transmission for this service, and active the duplication transmission for a data packet corresponding to the service.

For yet another example, when the judgment factors included in the first condition are a duplication Object, a number of HARQ retransmissions, and a threshold, and when the duplication object is a service, if an average value of the number of HARQ retransmissions of MAC PDUs used to transmit this service is greater than the threshold 3, the terminal device determines to active a duplication transmission for this service, and active the duplication transmission for a data packet corresponding to the service.

For yet another example, when the judgment factors included in the first condition are a duplication object, a number of ARQ retransmissions, and a threshold, and when the duplication object is a service, if an average value of the number of ARQ retransmissions of RLC PDUs used to transmit this service is greater than the threshold 4, the terminal device determines to active a duplication transmission for this service, and active the duplication transmission for a data packet corresponding to the service.

For yet another example, when the judgment factors included in the first condition are a duplication object, synchronization status, and a threshold, and when the duplication object is a carrier, if the number of times the terminal device being out-of-sync during transmitting this bearer is greater than the threshold 5, the terminal device determines to active a duplication transmission for this carrier, and active the duplication transmission for a data packet corresponding to the carrier.

For yet another example, when the judgment factors included in the first condition are a duplication object, a service type, and service status, and when the duplication object is a service, if a service type of URLLC service starts to be transmitted, the terminal device determines to active a duplication transmission for this service, and active the duplication transmission for a data packet corresponding to the service.

For yet another example, when the judgment factors included in the first condition are a duplication object, a service type, service information to be transmitted, and a threshold, and when the duplication object is a carrier, if an amount of data to be transmitted of a service type of URLLC service is greater than the threshold 6, the terminal device determines to active a duplication transmission for this carrier, and active the duplication transmission for a data packet corresponding to the carrier.

For yet another example, when the judgment factors included in the first condition are a duplication object, a service type, service status, and a threshold, and when the duplication object is a data packet, if a pattern of a service type of URLLC service changes and a. QoS requirement is greater than a required threshold 7, the terminal device determines to active a duplication transmission for this data packet, and active the duplication transmission for this data packet correspondingly.

For yet another example, when the judgment factors included in the first condition are a trigger condition, a service type, service status, and a threshold, and when the trigger condition is periodic trigger, if an amount of data to be transmitted of a service type of URLLC service is greater than the threshold 8 when the periodic trigger is met, the terminal device determines to active a duplication transmission for this service, and active the duplication transmission for a data packet corresponding to the service.

In an implementation, in an embodiment of the present application, the first condition includes but is not limited to at least one of the following:
a measured value of the reference signal being greater than a first threshold;
the measured value of the reference signal being equal to the first threshold;
a number of times that the measured value of the reference signal is continuously greater than or equal to the first threshold being greater than a second threshold;
the number of times that the measured value of the reference signal is continuously greater than or equal to the first threshold being equal to the second threshold;
a total number of times that the measured value of the reference signal is greater than or equal to the first threshold being greater than a third threshold;
the total number of times that the measured value of the reference signal is greater than or equal to the first threshold being equal to the third threshold;
a number of HARQ retransmissions being greater than a fourth threshold;
the number of HARQ retransmissions being equal to the fourth threshold;
a number of ARQ retransmissions being greater than a fifth threshold;
the number of ARQ retransmissions being equal to the fifth threshold;
a number of received out-of-sync indications being greater than a sixth threshold;
the number of received out-of-sync indications being equal to the sixth threshold;
a change of a service pattern;
start of a new service or end of a service;
a traffic amount to be transmitted being less than a seventh threshold;
the traffic amount to be transmitted being greater than or equal to the seventh threshold;
start of a first service or end of a service;
a change of a service pattern of the first service;
a traffic amount of the first service to be transmitted being less than an eighth threshold; and
the traffic amount of the first service to be transmitted being greater than or equal to the eighth threshold.

In an implementation, in an embodiment of the present application, the first condition includes but is not limited to at least one of the following:
a measured value of the reference signal being less than a first threshold;
the measured value of the reference signal being greater than the first threshold;
the measured value of the reference signal being equal to the first threshold;
a number of times that the measured value of the reference signal is continuously less than or equal to the first threshold being greater than a second threshold;
the number of times that the measured value of the reference signal is continuously less than or equal to the first threshold being equal to the second threshold;
the number of times that the measured value of the reference signal is continuously greater than or equal to the first threshold being greater than the second threshold;
the number of times that the measured value of the reference signal is continuously greater than or equal to the first threshold being equal to the second threshold;
a total number of times that the measured value of the reference signal is less than or equal to the first threshold being greater than a third threshold;
the total number of times that the measured value of the reference signal is less than, or equal to the first threshold being equal to the third threshold;
the total number of times that the measured value of the reference signal is greater than, or equal to the first threshold being greater than the third threshold;
the total number of times that the measured value of the reference signal is greater than or equal to the first threshold being equal to the third threshold;
a number of HARQ retransmissions being greater than a fourth threshold;
the number of HARQ retransmissions being equal to the fourth threshold;
a number of ARQ retransmissions being greater than a fifth threshold;
the number of ARQ retransmissions being equal to the fifth threshold;
number of received out-of-sync indications being greater than a sixth threshold;
the number of received out-of-sync indications being equal to the sixth threshold;
a change of a service pattern;

start of a new service or end of a service;
a traffic amount to be transmitted being less than a seventh threshold;
the traffic amount to be transmitted being greater than or equal to the seventh threshold;
start of a first service or end of a service;
a change of a service pattern of the first service;
a traffic amount of the first service to be transmitted being less than an eighth threshold;
the traffic amount of the first service to be transmitted being greater than or equal to the eighth threshold;
a carrier priority being greater than or equal to a eleventh threshold;
the carrier priority being less than the eleventh threshold;
an identifier of a carrier or an identifier of an RLC entity or an identifier of a MAC entity or an identifier of a logical channel or an identifier of a bearer being a specific identifier;
a priority of a logical channel being greater than or equal to a twelfth threshold; and
the priority of the logical channel being less than the twelfth threshold.

In an implementation, in an embodiment of the present application, the terminal device triggers/activates a PDCP duplication (duplication) transmission according to a channel quality of the carrier.

For example, if the channel quality (such as RSRP/RSRQ/RSSI/SINR) of a current carrier transmitting a PDCP protocol data unit (PDU) is less than a threshold (the threshold is configured by a network device for the terminal device), the terminal device triggers/activates the PDCP duplication transmission.

For example, if the channel quality (such as RSRP/RSRQ/RSSI/SINR) of a current carrier transmitting PDCP PDU is less than a threshold (the threshold is configured by a network device for the terminal device), and the channel quality (such as RSRP/RSRQ/RSSI/SINR) of another carrier is greater than a threshold (the threshold is configured by a network device for the UE), the terminal device triggers/activates a PDCP duplication transmission. Furthermore, the terminal device selects a carrier used to transmit a duplication PDCP PDU according to a carrier usage priority indicated by the network device (the priority may be used to assist the terminal device in determining a carrier used to transmit the duplication PDCP PDU when multiple carriers meet the condition).

For example, if the channel quality (such as RSRP/RSRQ/RSSI/SINR) of a current carrier transmitting PDCP PDU is less than the threshold (the threshold is configured by a network device for the UE), and the priority of another carrier is greater than a threshold (the threshold is configured by a network device for the terminal device), the terminal device triggers/activates a PDCP duplication transmission. Furthermore, the terminal device selects a carrier used to transmit a duplication PDCP PDU according to a carrier usage priority indicated by the network device (the priority may be used to assist the terminal device in determining a carrier used to transmit the duplication PDCP PDU when multiple carriers meet the condition).

It should be noted that the above-mentioned first threshold to eighth threshold, well as the eleventh threshold and the twelfth threshold may be configured by the network device, or may be specified in a protocol. At the same time, specific values of the above-mentioned first threshold to the eighth threshold, as well as the eleventh threshold and the twelfth threshold may be determined according to actual needs, which is not limited in this application.

In an implementation, the first condition is for a cell where the terminal device resides and/or a neighbor cell of the cell where the terminal device resides and/or a configured cell; or, the first condition is for a cell to which the terminal device is connected and/or a neighbor cell of the cell to which the terminal device is connected and/or a configured cell.

It should be noted that the configured cell may be a pre-configured cell or a cell configured by the network device.

It should be noted that, in an embodiment of the present application, a measurement result of the reference signal may be a measurement result at a physical layer (an LI layer), or a measurement result at a higher layer (L3, for example, an RRC layer, a non-access stratum (NAS)).

In an implementation, in an embodiment of the present application, the first condition is pre-configured or configured by the network device.

For example, the first condition is notified in a broadcast.
For example, the first condition is specified in a protocol.
For example, the first condition is indicated by a radio resource control (RRC) message. For example, it is indicated in an RRC reconfiguration message, or indicated in a dedicated RRC message.
For example, the first condition is indicated in a measurement configuration message.
For example, the first condition is configured or instructed by a network device (for example, a base station) when the terminal device initially accesses the cell.
For example, the first condition is indicated by the network device (tor example, the base station) during a handover process of the terminal device, such as carried in a handover command.
For example, the first condition is indicated by the network device (for example, the base station) in a reconfiguration message.

In an implementation, in an embodiment of the present application, the terminal device determines whether the first condition is met in a case where a second condition is met.

In an implementation, the second condition includes but is not limited to at least one of the following:
periodically detecting whether the first condition is met, and a number of times that the first condition is met being greater than or equal to a ninth threshold,
periodically detecting a judgment factor of the first condition, and the judgment factor of the first condition being greater than or equal to a tenth threshold,
periodically detecting whether the first condition is met after receiving first indication information, and the number of times that the first condition is met being greater than or equal to the ninth threshold,
periodically detecting the judgment factor of the first condition after receiving the first indication information, and the judgment factor of the first condition being greater than or equal to the tenth threshold,
a change of a band width part (BWP),
network switching,
after receiving second indication information, and
after receiving a message including the first information.

It should be noted that the above-mentioned ninth threshold value and tenth threshold may be configured by the network device, or may be specified in a protocol. At the same time, specific values of the above-mentioned ninth threshold and the tenth threshold may be determined according to actual needs, which is not limited in this application.

In an implementation, in the second condition, the first indication information is carried in a first message, where the first message is one of an RRC message, a media access control control element (MAC CE), and downlink control information (DCI), and is dedicated to indicate the first indication information, or, the first message is a network message including the first information.

In an implementation, in the second condition, the second indication information is carried in a second message, where the second message is one of an RRC message, a MAC CF, and DO, and is dedicated to indicate the second indication information or, the second message is a network message including the first information.

In an implementation, in an embodiment of the present application, the terminal device determines whether to perform duplication transmission in a CA and/or DC scenario, and/or, the terminal device determines whether to trigger duplication transmission in a CA and: or the DC scenario; or,
  the terminal device determines whether to perform duplication transmission corresponding to two RLC entities or two paths or two carriers, and/or, the terminal device determines whether to trigger duplication transmission corresponding to at least two RLC entities or at least two paths or at least two carriers; or,
  the terminal device determines whether to perform duplication transmission in a CA and/or DC scenario according to a configuration or an instruction of a network device, and/or the terminal device determines whether to trigger duplication transmission in a CA and/or DC scenario according to a configuration or an instruction of a network device; or
  the terminal device determines whether to perform duplication transmission corresponding to two RLC entities or two paths or two carriers according to a configuration or an instruction of a network device, and/or the terminal device determines whether to trigger duplication transmission corresponding to at least two RLC entities or at least two paths or at least two carriers according to a configuration or an instruction of a network device.

In an implementation, in an embodiment of the present application, the foregoing step S210 may specifically be:
  in the case where the first condition is met, the terminal device determines whether to perform the duplication transmission in the CA and/or DC scenario, and/or, the terminal device determines whether to trigger the duplication transmission in the CA and: or DC scenario; or,
  in the case where the first condition is met, the terminal device determines whether to perform the duplication transmission corresponding to two RLC entities or two paths or two carriers, and/or, the terminal device determines whether to trigger the duplication transmission corresponding to at least two RLC entities or at least two paths or at least two carriers; or,
  the case where the first condition is met, the terminal device determines Whether to perform the duplication transmission in the CA and/or DC scenario according to a configuration or an instruction of the network device, and/or the terminal device determines whether to trigger the duplication transmission in the CA and/or DC scenario according to a configuration or an instruction of the network device, or
  in the case where the first condition is met, the terminal device determines whether to perform the duplication transmission corresponding to two RLC entities or two paths or two carriers according to a configuration or an instruction of the network device, and/or the terminal device determines whether to trigger the duplication transmission corresponding to at least two RLC entities or at least two paths or at least two carriers according to a configuration or an instruction of the network device.

It should be noted that the CA and the DC scenarios may be understood as a scenarios of a combination of CA and DC.

In an implementation, the terminal device may determine which RLC entity or which RLC entities perform the duplication transmission.

In an implementation, in an embodiment of the present application, the terminal device determines at least one Rif entity used to transmit a duplication based on at least one of channel quality information, a service characteristic, a service priority or a priority of a logical channel or a priority of a bearer or a priority of a carrier, a traffic amount of a bearer or a traffic amount of logical channel, a number of RLC entities used at the same time being less than the first threshold, an attribute of a time-frequency resource, an identifier of a time-frequency resource, a priority of a time-frequency resource, a size of a time-frequency resource, an identifier or a type of a bearer or an established service, an identifier of the service to be transmitted, an identifier of a logical channel to which the service to be transmitted belongs and an identifier of a logical channel group to which the service to be transmitted belongs.

It should be noted that the number of RLC entities used at the same time being less than the first threshold may also be the maximum/largest number of RLC entities used at the same time.

In an implementation, the maximum/largest number of RLC entities used at the same time refers to at least one of the following: the maximum or largest number of RLC entities that may be used to transmit a duplication at the same time, the maximum or largest number of RLC entities that may be used to transmit a duplication from the same PDCP entity or corresponding to the same hearer at the same time, the maximum or largest number of RLC entities that may be used to transmit a duplication and may be activated at the same time, the maximum or largest number of RLC entities that may be used to transmit a duplication from the same PDCP entity or corresponding to the same bearer and may be activated at the same time, the maximum or largest number of RLC entities that may be used to transmit a duplication from the same core network bearer and may be activated at the same time, and the maximum or largest number of RLC entities that may be used to transmit a duplication from the same core network bearer at the same time.

In an implementation, the maximum/largest number of RLC entities used at the same time may be based on a UE, based on a bearer, or based on a core network bearer. In an implementation, the maximum/largest number of RLC entities used at the same time may be active or transmissive (for example, simply two among three activations are used for transmissions). In an implementation, it may be configured by the network, or determined by the UE, or pre-configured. In an implementation, the maximum number of RLC entities activated or used to transmit the duplication for each bearer does not exceed two.

In an implementation, the service characteristic may be at least one of a quality of service QoS), a delay, a reliability, a priority, a period, an offset, a packet size, and a packet arrival interval.

For example, selecting an RLC entity with a channel quality higher than a threshold to transmit data,
  for example, when the reliability requirement is higher than a threshold 2, RLC entities according to the sorted channel quality or RLC entities whose channel qualities are greater than the threshold are selected to transmit the duplication, for example, when the maximum number of RLC entities used at the same time is 2, the two RLC entities that are sorted according to the channel quality or whose channel qualities are greater than the threshold are selected to transmit the duplication.

In an implementation, there may exist a one-to-one correspondence between the RLC entity corresponding to the bearer and the logical channel corresponding to the bearer. In an implementation, in the embodiment of the present application, in a case where the terminal device determines to perform the duplication transmission, a PDCP entity of the terminal device transmits, to at least one RLC entity, a data packet that triggers the duplication transmission, and/or the at least one RLC entity among PDCP entities corresponding to the terminal device performs data transmission and/or reception of the data packet that triggers the duplication transmission.

For example, in the CA+DC scenario shown in FIG. 2, a data packet from a PDCP may be transmitted through at least one RLC entity, and the number of the at least one RLC entity may be 1, 2, 3, 4 and etc.

In an implementation, in an embodiment of the present application, the terminal device transmits a data packet or a PDCP PDU on a first carrier, or transmits a data packet or the PDCP PDU or a copy of the PDCP PDU of a duplication on the first carrier, or transmits the data packet or the PDCP PDU on a carrier other than the first carrier, or transmits the data packet or the PDCP PDU or the copy of the PDCP PDU of the duplication on a carrier other than the first carrier: where the first carrier is a carrier that transmits the PDCP PDU, or the first carrier is a corresponding carrier when duplication is not used, or a configured specific carrier, or a default carrier, or the first carrier is a carrier carrying an initial configuration or a carrier used for an initial transmission.

It should be noted that the configured specific carrier may be a primary carrier, a primary carrier of a master node (MN), and may also be a primary carrier of a secondary node (SN). The primary carrier may be a carrier designated per bearer/PDCP.

For example, deactivating duplication transmission using the default carrier, activating duplication transmission using the default carrier and/or carriers other than the default carrier.

In an implementation, the terminal device determines, according to the first condition and/or the judgment tractor included in the first condition and/or the first information, the first carrier and/or a second carrier used for data transmission/duplication.

For example, the terminal device determines, according to the first condition, that the first carrier is used to transmit the data (that is, transmitting non-duplication).

For another example, the terminal device determines, according to the first condition, that the first carrier is used to transmit the duplication.

For another example, the terminal device determines, according to the first condition, that the second carrier is used to transmit the data (that is, transmitting non-duplication).

For another example, the terminal device determines, according to the first condition, that the second carrier is used to transmit the duplication.

For another example, the terminal device determines, according to the judgment factor included in the first condition, that the first carrier is used to transmit the data (that is, transmitting non-duplication).

For another example, the terminal device determines, according to the judgment factors included in the first condition, that the first carrier is used to transmit the duplication.

For another example, the terminal device determines, according to the judgment factors included in the first condition, that the second carrier is used to transmit the data (that is, transmitting non-duplication).

For another example, the terminal device determines, according to the judgment factors included in the first condition, that the second carrier is used to transmit the duplication.

For another example, the terminal device determines, according to the first information, that the first carrier is used to transmit the data (that is, transmitting non-duplication).

For another example, the terminal device determines, according to the first information, that the first carrier is used to transmit the duplication.

For another example, the terminal device determines, according to the first information, that the second carrier is used to transmit the data (that is, transmitting non-duplication).

For yet another example, the terminal device determines, according to the first information, that the second carrier is used to transmit the duplication.

It should be noted that the second carrier is a carrier other than the first carrier.

In an implementation, according to the first condition and/or the judgment factor included in the first condition and/or the first information and through comparison of information of the first carrier and/or a second carrier, the terminal device determines to perform a data or duplication transmission.

It should be noted that the information of the first carrier and/or the second carrier may be parameter information or configuration information.

In an implementation, according to the first condition and/or the judgment factor included in the first condition and/or the first information: the terminal device transmits the data packet or the PDCP PDU on a second carrier, or transmits the data packet or the PDCP PDU or the copy of the PDCP PDU of the duplication on the second carrier, or does not transmit the data packet or the PDCP PDU or the copy of the PDCP PDU of the duplication on the second carrier; or according to the first condition and/or the judgment factor included in the first condition and/or the first information, the terminal device transmits the data packet or the PDCP PDU on the first carrier and a second carrier, or transmits the data packet or the PDCP PDU or the copy of the PDCP PDU of the duplication on the first carrier and a second carrier; or according to the first condition and/or the judgment factor included in the first condition and/or the first information, the terminal device transmits the data packet or the PDCP PDU on a second carrier and a third carrier, or transmits the data packet or the PDCP PDU or the copy of the PDCP PDU of the duplication on a second carrier and the third carrier.

In an implementation, when a signal quality of the first carrier is less than a threshold or is reduced, according to the first condition and/or the Judgment factor included in the first condition and/or the first information, the terminal device transmits the data packet or the PDCP PDU on a second carrier, or transmits the data packet or the PDCP PDU or the copy of the PDCP PDU of the duplication on the second carrier; or when the signal quality of the first carrier is less than the threshold or is reduced, according to the first condition and/or the judgment factor included in the first condition and/or the first information, the terminal device transmits the data packet or the PDCP PDU on the first carrier and the second carrier, or transmits the data packet or the PDCP PDU or the copy of the PDCP PDU of the duplication on the first carrier and the second carrier; or, when the signal quality of the first carrier is less than the threshold or is reduced, according to the first condition and/or the judgment factor included in the first condition and/or the first information, the terminal device transmits the data packet or the PDCP PDU on the second carrier and a third carrier, or transmits the data packet or the PDCP PDU or the copy of the PDCP PDU of the duplication on the second carrier and the third carrier.

It should be noted that, in the embodiment of the present application, the transmission of the data packet or the PDCP PDU may be understood as the transmission of a data packet or a PDCP PDU for which the duplication transmission is not activated.

In an implementation, in an embodiment of the present application, the terminal device transmits the data packet or a PDCP PDU on a first RLC entity, or transmits a data packet or the PDCP PDU or a copy of the PDCP PDU of a duplication on the first RLC entity, or transmits the data packet or the PDCP PDU on an RLC entity other than the first RLC entity, or transmits the data packet or the PDCP PDU or the copy of the PDCP PDU of the duplication on an RLC entity other than the first RLC entity, Where the first RLC entity is a corresponding RLC entity when the duplication transmission is not used, or a configured specific RLC entity, Or a default. RLC entity, or the first RLC entity is tin RLC entity for transmitting a PDCP PDU, or an RLC entity carrying an initial configuration or an RLC entity used for an initial transmission.

In an implementation, the terminal device determines a first RLC entity and/or a second RLC entity used for data/duplication transmission according to the first condition and/or the judgment factor included in the first condition and/or the first information; or
the terminal device determines to transmit data or a duplication, according to the first condition and/or the judgment factor included in the first condition and/or the first information and through comparison of information of the first RLC entity and/or a second RLC entity.

The terminal device transmits the data packet or the PDCP PDU an a second RLC entity, or transmits the data packet or the PDCP PDU or the copy of the PDCP PDU of the duplication on a second RLC entity, according to the first condition and/or the judgment factor included in the first condition and/or the first information; or
the terminal device transmits the data packet or the PDCP PDU on the first RLC entity and a second. RLC entity, or transmits the data packet or the PDCP PDU or the copy of the PDCP PDU of the duplication on the first RLC entity and a second RLC entity, according to the first condition and/or the judgment factor comprised in the first condition and/or the first information; or
the terminal device transmits the data packet or the PDCP PDU on a second RIX entity and a third RLC entity, or transmits the data packet or the PDCP PDU or the copy of the PDCP PDU of the duplication on a second RLC entity and a third RLC entity, according to the first condition and/or the judgment factor comprised in the first condition and/or the first in formation.

In an implementation, when a signal quality of the first RLC entity is less than a threshold or is reduced, the terminal device transmits the data packet or the PDCP PDU on a second RLC entity, or transmits the data packet or the PDCP PDU or the copy of the PDCP PDU of the duplication on a second RLC entity, according to the first condition and/or the judgment factor comprised in the first condition and/or the first information; or
when the signal quality of the first RLC entity is less than the threshold or is reduced, the terminal device transmits the data packet or the PDCP PDU on the first REX entity and a second RLC entity, or transmits the data packet or the PDCP PDU or the copy of the PDCP PDU of the duplication on the first RLC entity and a second RLC entity, according to the first condition and/or the judgment factor comprised in the first condition and/or the first information; or
when the signal quality of the first RLC entity is less than the threshold or is reduced, the terminal device transmits the data packet or the PDCP PDU on a second RLC entity and a third RLC entity, or transmits the data packet or the PDCP PDU or the copy of the PDCP PDU of the duplication on a second RLC entity and a third RLC entity, according to the first condition and/or the judgment factor comprised in the first condition and/or the first in formation.

In an implementation, in an embodiment of the present application, at least one of the following is determined according to a first rule:
the terminal device determines, according to a first rule, to active or use the duplication transmission; or
the terminal device determines, according, to a first rule, a carrier or an RLC entity or a path for transmitting data or a duplication: or
the terminal device determines, according to a first rule, whether to use the duplication transmission; or
the terminal device determines, according to a first rule, whether to deactivate or not to use the duplication transmission; or
the terminal device determines, according to a first rule, an RLC entity or a carrier or a path used for transmitting data in a case where the duplication transmission is deactivated or not used or
the terminal device determines according to a first rule, an RLC entity or a carrier or a path, used for transmitting, data in a case where the duplication transmission is activated or used.

For example, the terminal device may determine, according to the first rule, to deactivate or not to use the duplication transmission. That is to say, in the embodiment of the present application, the terminal device may not only activate a data duplication and/or the duplication transmission, but also may deactivate or not use the duplication transmission.

In an implementation, the first rule is pre-configured or configured by a network device.

In an implementation, the first rule is the first condition or a first factor, wherein the first factor comprises at least one of following information: a reference signal, a number of HARD retransmissions, a number of ARQ retransmissions, a measurement object, synchronization status, a duplication object, a threshold, a service type, service status, service information to be transmitted, a trigger condition, a judgment object, a priority, a channel quality, an identifier of a logical channel, a type of a logical channel, a mode of an RLC entity (such as, an unacknowledged mode (UM) or an acknowledged mode (AM)), an identifier of a bearer, an identifier of a carrier, an identifier of an RLC entity, an identifier of a MAC entity, and a transmission quality.

That is, the first rule may also be the first information.

In an implementation, as an example I, the terminal device activates a data duplication and/or the duplication transmission in the case where the first condition is met; and/or deactivates, by the terminal device, a data duplication and/or the duplication transmission in a case where the first condition is not met.

In an implementation, in the example I, the terminal device starts or restarts a first timer when changing data duplication status and/or the duplication transmission or after a first time duration; or the terminal device starts or restarts a first timer when the terminal device triggers a change of data duplication status and/or the duplication transmission or after a first time duration;

where the data duplication status or a duplication transmission behavior does not change during a runtime of the first timer, or the data duplication status or a data duplication transmission behavior does not change under a certain condition during a runtime of the first timer.

In an implementation, in the example I, in a case where the terminal device activates the data duplication and/or the duplication transmission, the terminal device deactivates the data duplication and or the duplication transmission according to a first timer, where the data duplication status or a duplication transmission behavior does not change during a runtime of the first timer, or the data duplication status or a data duplication transmission behavior does not change under a certain condition during a runtime of the first timer.

It should be noted that the first timer may also be a time duration or a time period.

In an implementation, in the example I, in the case where the terminal device activates the data duplication and/or the duplication transmission, the terminal device starts the first timer until the first timer expires, and/or, deactivates the data duplication and/or the duplication transmission when the first timer expires.

In an implementation, in the example I, in the case where the terminal device activates the data duplication and/or the duplication transmission, the terminal device starts the first timer, and before the first tinier expires, if the first condition is met again or third indication information is received, the terminal device restarts the first timer until the first timer expires, and/or, deactivates the data duplication and/or the duplication transmission when the first timer expires, where the third indication information is used for indicating start or restart of the first timer, and is carried in at least one of a broadcast, RRC, a MAC CE, and In an implementation, as an example II, the terminal device deactivates a data duplication and/or the duplication transmission in the case where the first condition is met; and/or the terminal device activates a data duplication and/or the duplication transmission in a case where the first condition is not met.

In an implementation, in an example II, the terminal device starts or restarts a first timer when changing data duplication status and/or the duplication transmission or after a first time duration; or the terminal device starts or restarts a first timer when the terminal device triggers change of data duplication status and/or the duplication transmission or after a first time duration;

where the data duplication status or a duplication transmission behavior does not change during a runtime of the first timer, or the data duplication status or a data duplication transmission behavior does not change under a certain condition during a runtime of the first timer.

In an implementation, in the example IL in a case where the terminal device deactivates the data duplication and/or the duplication transmission, the terminal device activates the data duplication and/or the duplication transmission according to a first timer, where the data duplication status or a duplication transmission behavior does not change during a runtime of the first timer, or the data duplication status or a data duplication transmission behavior does not change under a certain condition during a runtime of the first timer.

In an implementation, in the example II, in the case where the terminal device deactivates the data duplication and/or the duplication transmission, the terminal device starts the first tinier until the first timer expires, and/or, activates the data duplication and/or the duplication transmission when the first timer expires.

In an implementation, in the example II, in the case where the terminal device deactivates the data duplication and/or the duplication transmission, the terminal device starts the first timer, and before the first timer expires, if the first: condition is met again or third indication information is received, the terminal device restarts the first timer until the first timer expires, and/or, activates the data duplication and/or the duplication transmission when the first timer expires, where the third indication information is used for indicating start or restart of the first timer, which is carried in at least one of a broadcast, RRC, a MAC CE, and DCI.

Specifically, in the above example I and example II, a start occasion of the first timer may be:

the terminal device starts the first timer in a case of receiving configuration information for the first timer; or the terminal device starts the first timer at a pre-configured start occasion in a case of receiving configuration information for the first timer; or the terminal device starts the first timer according to configuration information for the first timer in a case of receiving the configuration information for the first timer: or the terminal device starts the first timer in a case of receiving fourth indication information, wherein the fourth indication information is carried in at least one of a broadcast, RRC, a MAC CE, and DCI.

In an implementation, in an embodiment of the present application, the first timer is pre-configured or configured by a network device.

In an implementation, in an embodiment of the present application, the terminal device sends second information in a case of modifying or determining to modify a data duplication and/or the duplication transmission, where the second information is used for indicating a change of data duplication status or a duplication transmission behavior of the terminal device.

The second information includes but is not limited to: an RRC message, a MAC CE, and physical layer signaling.

In an implementation, the second information is specifically used for indicating:

a Change of the data duplication status or the duplication transmission behavior in ran uplink of the terminal device, and/or, a change of the data duplication status or the duplication transmission behavior in a downlink (DL) of the terminal device; and/or, a granularity of a change of the data duplication status or the duplication transmission behavior of the terminal device is any one of per bearer, per data packet, per service, per QoS flow, and per UE, or any one of at least one bearer, at least one data packet, at least one service, at least one QoS flow and at least one UE.

Assuming that there are 5 bearers, which are respectively denoted as a bearer 0 to a bearer 4. For example, the granularity of the change of the data duplication status or the duplication transmission behavior of the terminal device is per bearer in the 5 bearers; for another example, the granularity of the change of the data duplication status or the duplication transmission behavior of the terminal device is a part bearers among the 5 bearers (e.g., the bearer 0 and the bearer 1); for yet another example, the granularity of the change of the data duplication status or the duplication transmission behavior of the terminal device is a random bearer in the 5 bearers (e.g., the bearer 3); for yet another example, the granularity of the change of the data duplication status or the duplication transmission behavior of the terminal device is a specific bearer in the 5 bearers (e.g., the bearer 0).

Assuming that there are 5 data packets, which are respectively denoted as a data packet 0 to a data packet 4. For example, the granularity of the change of the data duplication status or the duplication transmission behavior of the terminal device is per data packet in the 5 data packets; for another example, the granularity of the change of the data duplication status or the duplication transmission behavior of the terminal device is a part data packets among the 5 data packets (e.g., the data packet 2 and the data packet 3); for yet another example, the granularity of the change of the data duplication status or the duplication transmission behavior of the terminal device is a random data packet in the 5 data packets (e.g., the data packet 4); for yet another example, the granularity of the change of the data duplication status or the duplication transmission behavior of the terminal device is a specific data packet in the 5 data packets (e.g., the data packet 0).

Assuming that there are 5 services, which are respectively denoted as a service 0 to a service 4. For example, the granularity of the change of the data duplication status or the duplication transmission behavior of the terminal device is per service in the 5 services; for another example, the granularity of the change of the data duplication status or the duplication transmission behavior of the terminal device is a part services among the 5 services (e.g., the service 2 and the service 3); for yet another example, the granularity of the change of the data duplication status or the duplication transmission behavior of the terminal device is a random service in the 5 services (e.g., the service 1); for yet another example, the granularity of the change of the data duplication status or the duplication transmission behavior of the terminal device is a specific service in the 5 services (e.g., the service 4).

Assuming that there are 5 QoS flows, which are respectively denoted as a. QoS flow 0 to a QoS flow 4. For example, the granularity of the change of the data duplication status or the duplication transmission behavior of the terminal device is per QoS flow in the 5 QoS flows for another example, the granularity of the change of the data duplication status or the duplication transmission behavior of the terminal device is a part QoS flows among the 5 QoS flows (e.g., the QoS flow 0 and the QoS flow 1); for yet another example, the granularity of the change of the data duplication status or the duplication transmission behavior of the terminal device is a random QoS flow in the 5 QoS flows (e.g., the QoS flow 4); for yet another example, the granularity of the change of the data duplication status or the duplication transmission behavior of the terminal device is a specific QoS flow in the 5 QoS flows (e.g., the QoS flow 0).

Assuming that there are 5 UEs, which are respectively denoted as a UE 0 to a UE 4. For example, the granularity of the change of the data duplication status or the duplication transmission behavior of the terminal device is per UE in the 5 UEs; for another example, the granularity of the change of the data duplication status or the duplication transmission behavior of the terminal device is a part of the 5 UEs (e.g., the UE 2 and the UE); for yet another example, the granularity of the change of the data duplication status or the duplication transmission behavior of the terminal device is a random UE in the 5 UEs (e.g., the UE 4); for yet another example, the granularity of the change of the data duplication status or the duplication transmission behavior of the terminal device is a specific UE in the 5 UEs (e.g., the UE 0).

In an implementation, in an embodiment of the present application, after sending the second information to a network device, the terminal device sends third information to the network device, where the third information is used for indicating RLC entity information that needs to be activated or deactivated in a data duplication transmission, where the RLC entity information includes but is not limited to at least one of following information: an identifier of a bearer, a service identifier, a data packet identifier, QoS flow information, an identifier of an RLC entity, an identifier of a logical channel corresponding to the RLC entity, and an identifier of a MAC entity corresponding to the RLC entity.

For example, instructing, to a network device, the identifier of the bearer needed to be used for transmitting data and the identifier of the RLC entity needed to be used for transmitting data.

For another example, instructing, to a network device, the identifier of the hearer needed to be used for transmitting data, the identifier of the RLC entity needed to be used for transmitting data, and the identifier of the RLC entity not needed to be used for transmitting data.

For yet another example, instructing, to a network device, the identifier of the bearer needed to be used for transmitting data and the identifier of the logical channel needed to be used for transmitting data.

For yet another example, instructing, to a network device, the data packet identifier and the identifier of the bearer needed to be used for transmitting data and the identifier of the channel needed to be used for transmitting data.

For yet another example, instructing, to a network device, the service identifier and the identifier of the bearer needed to be used and the identifier of the logical channel needed to be used for transmitting data.

For yet another example, instructing, to a network device, the identifier of the logical channel needed to be used for transmitting data.

For yet another example, instructing, to a network device, the identifier of the logical channel not needed to be used for transmitting data.

For yet another example, instructing, to a network device, the identifier of the MAC entity not needed to be used for transmitting data.

In an implementation, in an embodiment of the present application, abler sending the second information to a network device, the terminal device receives fourth information from the network device, where the fourth information is used but is not: limited for indicating at least one of: the data duplication status or the duplication transmission behavior of the terminal device, a data transmission behavior of the terminal device to a corresponding RLC entity, the data duplication status, and data duplication transmission information.

At this time, the data duplication status or the duplication transmission behavior of the terminal device is finally determined by the indication of the fourth information, and the second information is information for assisting duplication activation/deactivation at the terminal.

In an implementation, the fourth information is carried by one of RRC message, MAC CE, and DCI.

In an implementation, the fourth information includes but is not limited to at least one of: an activation/deactivation instruction, information of a duplication object, an identifier of a bearer, a service identifier, a data packet identifier, QoS flow information, an identifier of an RLC entity, an identifier of a logical channel corresponding to the RLC entity, an identifier of a PDCP entity corresponding to the RLC entity, and an identifier of a MAC entity corresponding to the RLC entity.

In an implementation, in an embodiment of the present application, a network device may notify the terminal device of configured information of the duplication b an RRC reconfiguration message. The information of the duplication includes but is not limited to: information of a duplication object, an identifier of a bearer, a service identifier, an identifier of a PDCP entity corresponding to a bearer of the duplication, an identity of a corresponding RLC entity, a mapping relationship between a PDCP entity and an RLC entity, etc.

In an implementation, in an embodiment of the present application, a network device informs the terminal device that configured initial duplication status is deactivated status through an RRC reconfiguration message, that is, a corresponding bearer or data packet is transmitted through an RLC entity. It should be noted that: this RLC entity may be a default RLC entity, e.g., an RLC entity configured when the bearer is established; it may also be an RLC entity indicated in an RRC message, e.g., an identifier of the RLC entity is carried in an RRC message.

Therefore, in the embodiments of the present application, in a scenario Where CA and DC are combined, in a case that a first condition is met, a terminal device determines whether to perform a duplication transmission, and/or, the terminal device determines whether to trigger a duplication transmission. Furthermore, in a case where the terminal device determines to perform the duplication transmission, a PDCP entity of the terminal device transmits, to at least one RLC entity, a data packet that triggers the duplication transmission, and/or, at least one RLC entity among PDCP entities corresponding to the terminal device performs data transmission and: or reception of a data packet that triggers the duplication transmission, so that one PDCP entity may use at least one RLC entity to transmit the duplication, and/or, adopt methods for data duplication and/or duplication transmission with different granularities, thus avoiding using all RLC entities to transmit the duplication during the activation, reducing a waste of resources in the duplication transmission scenario, improving system resource utilization, and ensuring the transmission performance of services such as a URLLC service while ensuring the overall transmission performance of the system.

In an embodiment of the present application, as an embodiment, the terminal device may also determine whether to perform a duplication transmission and/or, the terminal device determines whether to trigger a duplication transmission, without relying on the first condition.

It should be noted that, in the embodiment, independent of the first condition in the method 200, the terminal device may also determine whether to perform the duplication transmission, and/or, the terminal device determines whether to trigger the duplication transmission.

Specifically, when modifying a data duplication and/or the duplication transmission, the terminal device activates the data replication and/or the duplication transmission according to a second timer.

For example, when modifying or determines to modify a data duplication and/or the duplication transmission, the terminal device starts or restarts the second timer until the second timer expires, and/or, modifies the data duplication and/or the duplication transmission again when the second timer expires.

For another example, when modifying a data duplication and/or the duplication transmission, the terminal device starts or restarts the second timer, and before the second timer expires, if the data duplication and/or the duplication transmission changes again or fifth indication information indicating a start or a restart of the second timer is received, the terminal device restarts the second timer until the second timer expires, and/or, modifies the data duplication and/or the duplication transmission again when the second timer expires.

It should be noted that the second timer may also be a time duration or time period.

In an implementation, the fifth indication information is carried in at least one of a broadcast, RRC, a MAC CE, and DCI.

In an implementation, in the embodiment, in a case that the terminal device determines to perform the duplication transmission, a PDCP entity of the terminal device transmits, to at least one RLC entity, a data packet that triggers the duplication transmission, and/or at least one RLC entity among PDCP entities corresponding to the terminal device performs data transmission and/or reception of a data packet that triggers the duplication transmission.

Therefore, in a scenario where CA and DC are combined, or, in a CA scenario or a DC scenario, when modifying a data duplication and/or the duplication transmission, the terminal device actives a data duplication and/or a duplication transmission according to a second timer. Furthermore, in a case where the terminal device determines to perform the duplication transmission, a PDCP entity of the terminal device transmits, to at least one RLC entity, a data packet that triggers the duplication transmission, and: or at least one RLC entity among PDCP entities corresponding to the terminal device performs data transmission and/or reception of a data packet that triggers the duplication transmission, so that one PDCP entity may use at least one RLC entity or more than two RLC entities to transmit the duplication, and/or, adopt methods for data duplication and/or duplication transmission with different granularities, thus avoiding using all RLC entities to transmit the duplication during the activation, reducing a waste of resources in the duplication transmission scenario, improving system resource utilization, and ensuring the transmission performance of services such as a UREIC service while ensuring the overall transmission performance of the system.

In an implementation, in the embodiment, the data duplication status or a duplication transmission behavior does not change during a runtime of the second timer, or the data duplication status or a data duplication transmission behavior does not change under a certain condition during a runtime of the second timer.

In an implementation, in the embodiment, a start occasion of the second timer may be:
the terminal device starts the second timer in a case of receiving configuration information for the second timer; or
the terminal device starts the second timer at a preconfigured start occasion in a case of receiving configuration information for the second timer; or
the terminal device starts the second tinier according to configuration information for the second timer in a case of receiving the configuration information for the second timer; or
the terminal device starts the second timer in a case of receiving sixth indication information, where the sixth indication information is carried in at least one of a broadcast, RRC, a MAC CE, and DCI.

It should be understood that, for steps in the embodiment, reference may be made to the corresponding steps in the wireless communication method 200, and for the sake of brevity, details are not repeated herein.

Figure 4:
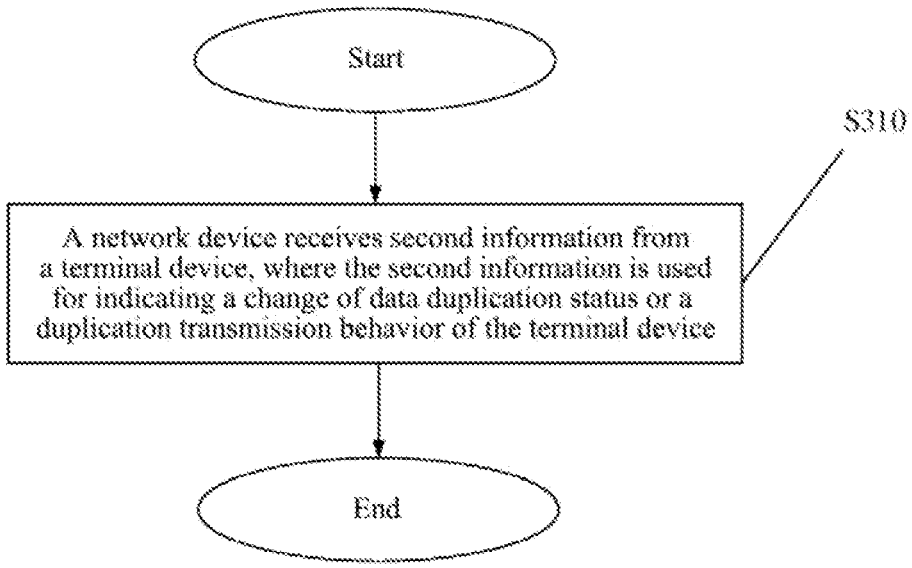
FIG. 4 is a schematic flowchart of another wireless communication method according to an embodiment of the present application.

FIG. 4 is a schematic flowchart of a wireless communication method 300 according to an embodiment of the present application. The method 300 may be applied to the communication system 100 shown in FIG. 1 and applied to the scenario where CA and DC are combined as shown in FIG. 2. Specifically, as shown in FIG. 4, the method. 300 may include the following contents:

S310: a network device receives second information from a terminal device, where the second information is used for indicating, a change of data duplication status or a duplication transmission behavior of the terminal device.

In an implementation, the second information includes but is not limited to: an RRC message, a MAC CE, and physical layer signaling.

In an implementation, the network device receives third information from the terminal device, where the third information is used for indicating RLC entity information that needs to be activated or deactivated in a duplication transmission,
where the RLC entity information comprises at least one of following information: an identifier of a bearer, a service identifier, a data packet identifier, QoS flow information, an identifier of an RLC entity, an identifier of a logical channel corresponding to the RLC entity, an identifier of a PDCP entity corresponding to the RLC entity, and an identifier of a MAC entity corresponding to the RLC entity.

It should be noted that the third information may be received after the reception of the second information, or may be received together with the second information.

In an implementation, in an embodiment of the present application, the network device sends fourth information to the terminal device, where the fourth information is used but is not limited for indicating at least one of: the data duplication status or the duplication transmission behavior of the terminal device, a data transmission behavior of the terminal device to a corresponding RLC entity, the data duplication status, and data duplication transmission information.

It should be noted that after receiving the second information, the network device determines and sends the fourth information based on the second information, or, after receiving the second information and the third information, the network device determines and sends the fourth information based on the second information and the third information.

In an implementation, in an embodiment of the present application, the fourth information includes but is not limited to at least one of following information:
an activation/deactivation instruction, information of a duplication object, an identifier of a bearer, a service identifier, a data packet identifier, QoS now, information, an identifier of an RLC entity, an identifier of a logical channel corresponding to the RLC entity, an identifier of a PDCP entity corresponding to the RLC entity, and an identifier of a MAC entity corresponding to the RLC entity.

In an implementation, in an embodiment of the present application, the network device sends first configuration information to the terminal device, where the first configuration information is used for configuring a first timer, and the first timer is used for deactivating a data duplication and/or a duplication transmission at the peer end, and/or, the first timer is used for activating a data duplication and/or a duplication transmission at the peer end.

In an implementation, in an embodiment of the present application, the network device sends first information to the terminal device, where the first information is used for indicating a trigger condition of a change of a data duplication, used for deactivating a data duplication and/or a duplication transmission, and/or, used for activating a data duplication and/or a duplication transmission.

In an implementation, the first information includes but is not limited to at least one of following information: a reference signal, a number of HARQ retransmissions, a number of ARQ retransmissions, a measurement object, synchronization status, a duplication object, a threshold, a service type, service status, service information to be transmitted, a trigger condition and a judgment object.

In an implementation, the first information includes but is not limited to at least one of following information: a reference signal, a number of HARQ retransmissions, a number of ARQ retransmissions, a measurement object, synchronization status, a duplication object, a threshold, a service type, service status, service information to be transmitted, a trigger condition, a judgment object, a priority, a channel quality, an identifier of a logical channel, a type of a logical channel, a mode of an RLC entity, an identifier of a bearer, an identifier of a carrier, an identifier of an RLC entity, an identifier of a MAC entity, and a transmission quality.

In an implementation, the duplication object includes but is not limited to one of: a bearer, a data packet, a service, a quality of service QoS flow, and a terminal device.

In an implementation, the reference signal includes but is not limited to at least one of: an SSB, a CSI-RS, and an SRS.

In an implementation, the measurement object includes but is not limited to at least one of: ran RSRP, an RSRQ, an RSSI, and an SINR.

In an implementation, the service type includes but is not limited to at least one of: a URLLC service, an industrial Internet of Things service, an Internet of Vehicles service, a time-sensitive network carried service, a vertical industry service, and an eMBB service.

In an implementation, the trigger condition includes but is not limited to at least one of:

a measured value of the reference signal being greater than a first threshold;
the measured value of the reference signal being equal to the first threshold;
a number of times that the measured value of the reference signal is continuously greater than or equal to the first threshold being greater than a second threshold;
the number of times that the measured value of the reference signal is continuously greater than or equal to the first threshold being equal to the second threshold;
a total number of times that the measured value of the reference signal is greater than or equal to the first threshold being greater than a third threshold;
the total number of times that the measured value of the reference signal is greater than or equal to the first threshold being equal to the third threshold;
a number of HARQ retransmissions being greater than a fourth threshold;
the number of HARQ retransmissions being equal to the fourth threshold;
a number of ARQ retransmissions being greater than a fifth threshold;
the number of ARQ retransmissions being equal to the fifth threshold;
a number of received out-of-sync indications being greater than a sixth threshold;
the number of received out-of-sync indications being equal to the sixth threshold;
a change of a service pattern;
start of a new service or end of a service;
a traffic volume to be transmitted being less than a seventh threshold;
the traffic volume to be transmitted being greater than or equal to the seventh threshold;
start of a first service or end of a service;
a change of a service pattern of the first sere ice;
a traffic volume of the first service to be transmitted being less than an eighth threshold; and
the traffic volume of the first service to be transmitted being greater than or equal to the eighth threshold.

In an implementation, the trigger condition includes but is not limited to at least one of:
a measured value of the reference signal being less than a first threshold;
the measured value of the reference signal being greater than the first threshold;
the measured value of the reference signal being equal to the first threshold;
a number of times that the measured value of the reference signal is continuously less than or equal to the first threshold being greater than a second threshold;
the number of times that the measured value of the reference signal is continuously less than or equal to the first threshold being equal to the second threshold;
the number of times that the measured value of the reference signal is continuously greater than or equal to the first threshold being, greater than the second threshold;
the number of times that the measured value of the reference signal is continuously greater than or equal to the first threshold being equal to the second threshold;
a total number of times that the measured value of the reference signal is less than or equal to the first threshold being greater than a third threshold;
the total number of times that the measured value of the reference signal is less than or equal to the first threshold being equal to the third threshold;
the total number of times that the measured value of the reference signal is greater than or equal to the first threshold being greater than the third threshold;
the total number of times that the measured value of the reference signal is greater than or equal to the first threshold being equal to the third threshold;
a number of HARQ retransmissions being greater than a fourth threshold;
the number of HARQ retransmissions being equal to the fourth threshold;
a number of ARQ retransmissions being greater than a fifth threshold;
the number of ARQ retransmissions being equal to the fifth threshold;
a number of received out-of-sync indications being greater than a sixth threshold;
the number of received out-of-sync indications being equal to the sixth threshold;
a change of a service pattern;
start of a new service or end of a service;
a traffic volume to be transmitted being less than a seventh threshold;
the traffic volume to be transmitted being greater than or equal to the seventh threshold;
start of a first service or end of a service;
a change of a service pattern of the first service;
a traffic volume of the first service to be transmitted being less than an eighth threshold;
the traffic volume of the first service to be transmitted being greater than or equal to the eighth threshold;
a carrier priority being greater than or equal to a eleventh threshold;
the carrier priority being less than the eleventh threshold;
an identifier of a carrier or an identifier of an RLC entity or an identifier of a MAC entity or an identifier of a logical channel or an identifier of a bearer being a specific identifier;
a priority of a logical channel being greater than or equal to a twelfth threshold; and
the priority of the logical channel being less than the twelfth threshold.

In an implementation, the trigger condition is ter a cell where the terminal device resides and/or a neighbor cell of the cell where the terminal device resides and/or a configured cell; or, the first condition is for a cell to which the terminal device is connected and/or a neighbor cell of the cell to which the terminal device is connected and/or a configured cell.

It should be understood that, for steps in the wireless communication method 300, reference may be made to corresponding steps in the wireless communication method 200, and for the sake of brevity, details are not repeated herein.

Therefore, in the embodiments of the present application, in a scenario where CA and DC are combined, the network device may determine data duplication status or a duplication transmission behavior of a terminal device based on second information sent by the terminal device, and indicate the terminal device at least one of: a data transmission behavior of the terminal device to a corresponding RLC entity, the data duplication status, and data duplication transmission information. Thus, in a case where the terminal device determines to perform the duplication transmission, a PDCP entity of the terminal device transmits, to at least one RLC entity (indicated by the network device), a data packet that triggers the duplication transmission, and/or at least one RLC entity (indicated by the network device)

among PDCP entities corresponding to the terminal device performs data transmission and/or reception of a data packet that triggers the duplication transmission, so that one PDCP entity may use at least one or more than two RLC entities to transmit the duplication, and/or, adopt methods for data duplication and/or duplication transmission with different granularities, thus avoiding using all RLC entities to transmit the duplication during the activation, reducing a waste of resources in the duplication transmission scenario, improving system resource utilization, and ensuring the transmission performance of services such as a URLLC service while ensuring the overall transmission performance of the system.

Figure 5:
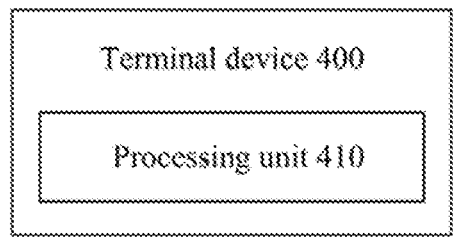
FIG. 5 is a schematic block diagram of a terminal device according to an embodiment of the present application.

FIG. 5 is a schematic block diagram of a terminal device 400 according to an embodiment of the present application. The terminal device 400 may be applied to a scenario where CA and DC are combined, as shown in FIG. 5, the terminal device 400 includes:

a processing unit 410, configured to: in a case where a first condition is met, a terminal device determines whether to perform a duplication transmission, or the terminal device determines whether to trigger a duplication transmission.

In an implementation, the processing unit 410 is further configured to determine the first condition and/or a judgment factor included in the first condition according to first information, where the first information includes at least one of the following information: a reference signal, a number of HAM) retransmissions, a number of ARQ retransmissions, a measurement object, synchronization status, a duplication object, a threshold, a service type, service status, service information to be transmitted, a trigger condition, and a judgment object.

In an implementation, the processing unit 410 is further configured to determine the first condition and/or a judgment factor included in the first condition according to first information, among them, the first information includes at least one of the following information: a reference signal, a number of HARQ retransmissions, a number of ARQ retransmissions, a measurement object, synchronization status, a duplication object, a threshold, a service type, service status, service information to be transmitted, a trigger condition, a judgment object, a priority, a channel quality, an identifier of a logical channel, a type of a logical channel, a mode of an RLC entity, an identifier of a bearer, an identifier of a carrier, an identifier of an RUC entity, an identifier of a MAC entity, and a transmission quality.

In an implementation, a part of or all information included in the first information is configured or instructed by a network device; and/or, a part of or all information included in the first information is the first condition or a first factor or a first rule.

In an implementation, the duplication object includes one of a bearer, a data packet, a service, a QoS flow, and a terminal device.

In an implementation, the reference signal includes at least one of the following: an SSB, a CSI-RS, and an SRS.

In an implementation, the measurement Object includes at least one of the following: an RSRP, an RSRQ, an RSSI, and an SINR.

In an implementation, the service type includes at least one of the following; a URLLC service, an industrial Internet. of Things service, an Internet of Vehicles service, a time-sensitive network carried service, a vertical industry service, and an eMBB service.

In an implementation, the first condition includes at least one of the following: a measured value of the reference signal being greater than a first threshold; the measured value of the reference signal being equal to the first threshold; a number of times that the measured value of the reference signal is continuously greater than or equal to the first threshold being greater than a second threshold; the number of times that the measured value of the reference signal is continuously greater than or equal to the first threshold being equal to the second threshold: a total number of times that the measured value of the reference signal is greater than or equal to the first threshold being greater than a third threshold; the total number of times that the measured value of the reference signal is greater than or equal to the first threshold being equal to the third threshold; a number of HARQ retransmissions being greater than a fourth threshold; the number of HARQ retransmissions being equal to the fourth threshold; a number of ARQ retransmissions being greater than a fifth threshold; the number of ARQ retransmissions being equal to the fifth threshold; a number of received out-of-sync indications being greater than a sixth threshold; the number of received out-of-sync indications being equal to the sixth threshold; a change of a service pattern; start of a new service or end of a service; a traffic amount to be transmitted being less than a seventh threshold; the traffic amount to be transmitted being greater than or equal to the seventh threshold: start of a first service or end of a service: a change of a service pattern of the first service; a traffic amount of the first service to be transmitted being less than an eighth threshold; and the traffic amount of the first service to be transmitted being greater than or equal to the eighth threshold.

In an implementation, the first condition includes at least one of the following: a measured value of the reference signal being less than a first threshold; the measured value of the reference signal being greater than the first threshold; the measured value of the reference signal being equal to the first threshold; a number of times that the measured value of the reference signal is continuously less than or equal to the first threshold being greater than a second threshold; the number of times that the measured value of the reference signal is continuously less than or equal to the first threshold being equal to the second threshold; the number of times that the measured value of the reference signal is continuously greater than or equal to the first threshold being greater than the second threshold; the number of times that the measured value of the reference signal is continuously greater than or equal to the first threshold being equal to the second threshold; a total number of times that the measured value of the reference signal is less than or equal to the first threshold being greater than a third threshold; the total number of times that the measured value of the reference signal is less than or equal to the first threshold being equal to the third threshold; the total number of times that the measured value of the reference signal is greater than or equal to the first threshold being greater than the third threshold; the total number of times that the measured value of the reference signal is greater than or equal to the first threshold being equal to the third threshold; a number of HARQ retransmissions being greater than a fourth threshold; the number of HARQ retransmissions being equal to the fourth threshold; a number of ARQ retransmissions being greater than a fifth threshold; the number of ARQ retransmissions being equal to the fifth threshold; a number of received out-of-sync indications being greater than a sixth threshold; the number of received out-of-sync indications being equal to the sixth threshold; a change of a service pattern; start of a new service or end of a service; a traffic amount to be transmitted being less than a seventh threshold; the traffic amount to be transmitted being greater than or equal to the seventh threshold; start of a first service or end of a service; a change of a service pattern of the first service; a traffic amount of the first service to be transmitted being less than an eighth threshold; the traffic amount of the first service to be transmitted being greater than or equal to the eighth threshold; a carrier priority being greater than or equal to a eleventh threshold; the carrier priority being less than the eleventh threshold; an identifier of a carrier or an identifier of an RLC entity or an identifier of a MAC entity or an identifier of a logical channel or an identifier of a bearer being a specific identifier; a priority of a logical channel being greater than or equal to a twelfth threshold; and the priority of the logical channel being less than the twelfth threshold.

In an implementation, the first condition is for a cell where the terminal device resides and/or a neighbor cell of the cell where the terminal device resides and/or a configured cell; or, the first condition is for a cell to which the terminal device is connected and/or a neighbor cell of the cell to which the terminal device is connected and/or a configured cell.

In an implementation, the processing unit 410 is further configured to determine whether the first condition is met in a case where a second condition is met.

In an implementation, the second condition includes at least one of the following:
  periodically detecting whether the first condition is met, and a number of times that the first condition is met being greater than or equal to a ninth threshold,
  periodically detecting a judgment factor of the first condition, and the judgment factor of the first condition being greater than or equal to a tenth threshold,
  periodically detecting whether the first condition is met after receiving first indication information, and the number of times that the first condition is met being greater than or equal to the ninth threshold,
  periodically detecting the judgment factor of the first condition after receiving the first indication information, and the judgment factor of the first condition being greater than or equal to the tenth threshold,
  a change of a band width part (BWP),
  network switching,
  after receiving second indication information, and
  after receiving a message including the first information.

In an implementation, the first indication information is carried in a first message, where the first message is one of an RRC message, a. MAC CE and DO, and is dedicated to indicate the first indication information, or, the first message is a network message including the first information.

In an implementation, the second indication information is carried in a second message, where the second message is one of an RRC message, a MAC CE, and DCI, and is dedicated to indicate the second indication information, or, the second message is a network message including the first information.

In an implementation, the processing unit 410 is further configured to:
  in the case where the first condition is met, determine whether to perform the duplication transmission in the CA and/or DC scenario, and/or, determine whether to trigger the duplication transmission in the CA and/or DC scenario; or,
  in the case where the first condition is met, determine whether to perform the duplication transmission corresponding to two RLC entities or two paths or two carriers, and/or, determine whether to trigger the duplication transmission corresponding to at least two RLC entities or at least two paths or at least two carriers; or,
  in the case where the first condition is met, determine whether to perform the duplication transmission in the CA and/or DC scenario according to a configuration or an instruction of the network device, and or, determine whether to trigger the duplication transmission in the CA and/or DC scenario according to a configuration or an instruction of the network device, or
  in the case where the first condition is met, determine whether to perform the duplication transmission corresponding to two RLC entities or two paths or two carriers according to a configuration or an instruction of the network device, and/or, determine whether to trigger the duplication transmission corresponding to at least two RLC entities or at least two paths or at least two carriers according to a configuration or an instruction of the network device.

In an implementation, the processing unit 410 is further configured to:
  determine at least one RLC entity used to transmit a duplication based on at least one of channel quality information, a service characteristic, a service priority or a priority of a logical channel or a priority of a bearer or a priority of a carrier, a traffic amount of a bearer or a traffic amount of logical channel, a number of RLC entities used at the same time being less than the first threshold, an attribute of a time-frequency resource, an identifier of a time-frequency resource, a priority of a time-frequency resource, a size of a time-frequency resource, an identifier or a type of a bearer or an established service, an identifier of the service to be transmitted, an identifier of a logical channel to which the service to be transmitted belongs and an identifier of a logical channel group to which the service to be transmitted belongs.

In an implementation, the processing unit 410 is further configured to:
  in a case of determining to perform the duplication transmission, control a PDCP entity of the terminal device to transmit a data packet that triggers the duplication transmission to at least one RUC entity; and/or,
  in a case of determining to perform the duplication transmission, control at least one RLC entity among PDCP entities corresponding to the terminal device perform data transmission and/or reception of the data packet that triggers the duplication transmission.

In an implementation, the terminal device 400 further includes:
  a communicating unit 420, configured to transmit a data packet or a PDCP PDU on a first carrier, or transmit a data packet or the PDCP PDU or a copy of the PDCP PDU of a duplication on the first carrier, or transmit the data packet or the PDCP PDU on a carrier other than the first carrier, or transmit the data packet or the PDCP PDU or the copy of the PDCP PDU of the duplication on a carrier other than the first carrier; where the first carrier is a carrier that transmits the PDCP PDU, or the first carrier is a corresponding carrier when duplication is not used, or a configured specific carrier, or a default carrier, or the first carrier is a carrier carrying an initial configuration or a carrier used for an initial transmission.

In an implementation, the processing unit 410 is further configured to determine, according to the first condition and/or the judgment factor included in the first condition and/or the first information, the first carrier and/or a second carrier used for data transmission/duplication.

In an implementation, the processing unit 410 is further configured to determine, according to the first condition and/or the judgment factor included in the first condition and/or the first information and through comparison of information of the first carrier and/or a second carrier, to perform a data or duplication transmission.

In an implementation, the communicating unit 420 is specifically configured to:
  according to the first condition and/or the judgment factor included in the first condition and/or the first information, transmit the data packet or the PDCP PDU on a second carrier, or transmit the data packet or the PDCP PDU or the copy of the PDCP PDU of the duplication on the second carrier, or not transmit the data packet or the PDCP PDU or the copy of the PDCP PDU of the duplication on the second carrier; or
  according to the first condition and/or the judgment factor included in the first condition and/or the first information, transmit the data packet or the PDCP PDU on the first carrier and a second carrier, or transmit the data packet or the PDCP PDU or the copy of the PDCP PDU of the duplication on the first carrier and a second carrier: or
  according to the first condition and/or the judgment factor included in the first condition and/or the first information, transmit the data packet or the PDCP PDU on a second carrier and a third carrier, or transmit the data packet or the PDCP PDU or the copy of the PDCP PDU of the duplication on a second carrier and the third carrier.

In an implementation, the communicating unit 420 is specifically configured to:
  when a signal quality of the first carrier is less than a threshold or is reduced, according to the first condition and/or the judgment factor included in the first condition and/or the first information, transmit the data packet or the PDCP PDU on a second carrier, or transmit the data packet or the PDCP PDU or the copy of the PDCP PDU of the duplication on the second carrier; or
  when the signal quality of the first carrier is less than the threshold or is reduced, according to the first condition and/or the judgment factor included in the first condition and/or the first information, transmit the data packet or the PDCP PDU on the first carrier and the second carrier, or transmit the data packet or the PDCP PDU or the copy of the PDCP PDU of the duplication on the first carrier and the second carrier; or,
  when the signal quality of the first carrier is less than the threshold or is reduced, according to the first condition and/or the judgment factor included in the first condition and/or the first information, the terminal device transmit the data packet or the PDCP PDU on the second carrier and a third carrier, or transmit the data packet or the PDCP PDU or the copy of the PDCP PDU of the duplication on the second carrier and the third carrier.

In an implementation, the terminal device 400 further includes:
  a communicating unit 420, configured to transmit the data packet or a PDCP PDU on a first. RLC entity, or transmit a data packet or the PDCP PDU; or a copy of the PDCP PDU of a duplication on the first RLC entity, or transmit the data packet or the PDCP PDU on an RLC entity other than the first RLC entity, or transmit the data packet or the PDCP PDU or the copy of the PDCP PDU of the duplication on an RLC entity other than the first RLC entity, where the first RUC entity is a corresponding RLC entity when the duplication transmission is not used, or a configured specific RLC entity, or a default RLC entity, or the first RLC entity is an RUC entity for transmitting a PDCP PDU, or an RUC entity carrying an initial configuration or an RLC entity used for an initial transmission.

In an implementation, the processing unit 410 is further configured to determine a first RUC entity and/or a second RLC entity used for data duplication transmission according to the first condition and/or the judgment factor included in the first condition and/or the first information.

In an implementation, the processing unit 410 is further configured to determine to transmit data or a duplication, according to the first condition and/or the judgment factor included in the first condition and or the first information and through comparison of information of the first RLC entity and/or a second RLC entity.

In an implementation, the communicating unit 420 is specifically configured to:
  transmit the data packet or the PDCP PIXY on a second RLC entity, or transmit the data packet or the PDCP PDU or the copy of the PDCP PDU of the duplication on a second RLC entity, according to the first condition and/or the judgment factor included in the first condition and/or the first information; or
  transmit the data packet or the PDCP VDU on the first RLC entity and a second RLC entity, or transmit the data packet or the PDCP PDU or the copy of the PDCP PDU of the duplication on the first RLC entity and a second RLC entity, according to the first condition and/or the judgment factor comprised in the first condition and/or the first information; or
  transmit the data packet or the PDCP PDU on a second RLC entity and a third RLC entity, or transmit the data packet or the PDCP PDU or the copy of the PDCP PDU of the duplication on a second RLC entity and a third RLC entity, according to the first condition and/or the judgment factor comprised in the first condition and/or the first information.

In an implementation, the communicating unit 420 is specifically configured to;
  when a signal quality of the first RLC entity is less than a threshold or is reduced, transmit the data packet or the PDCP PDU on a second RLC entity, or transmit the data packet or the PDCP PDU or the copy of the PDCP PDU of the duplication on a second RLC entity, according to the first condition and/or the judgment factor comprised in the first condition and: or the first information; or
  when the signal quality of the first RLC entity is less than the threshold or is reduced, transmit the data packet or the PDCP PDU on the first RLC entity and a second RLC entity, or transmit the data packet or the PDCP PDU or the copy of the PDCP PDU of the duplication on the first RLC entity and a second RLC entity, according to the first condition and/or the judgment factor comprised in the first condition and/or the first information: or
  when the signal quality of the first RLC entity is less than the threshold or is reduced, transmit the data packet or the PDCP PDU on a second RLC entity and a third RLC entity, or transmit the data packet or the PDCP PDU or the copy of the PDCP PDU of the duplication on a second RLC entity and a third RLC entity, according to the first condition and/or the judgment factor comprised in the first condition and/or the first information.

In an implementation, the processing unit 410 is further configured to:
- determine, according to a first rule, to active or use the duplication transmission; or
- determine, according to a first rule, a carrier or an RLC entity or a path for transmitting data or a duplication; or
- determine, according to a first rule, whether to use the duplication transmission; or
- determine, according to a first rule, whether to deactivate or not to use the duplication transmission; or
- determine, according to a first rule, an RLC entity or a carrier or a path used for transmitting data in a case where the duplication transmission is deactivated or not used; or
- determine according to a first rule, an RLC entity or a carrier or a path used for transmitting data in a case where the duplication transmission is activated or used.

In an implementation, the first rule is pre-configured or configured by a network device.

In an implementation, the first rule is the first condition or a first factor, wherein the first factor comprises at least one of following information: a reference signal, a number of HARQ retransmissions, a number of ARQ retransmissions, a measurement object, synchronization status, a duplication object, a threshold, a service type, service status, service information to be transmitted, a trigger condition, a judgment object, a priority, a channel quality, an identifier of a logical channel, a type of a logical channel, a mode of an RLC entity, an identifier of a bearer, an identifier of a carrier, an identifier of an RLC entity, an identifier of a MAC entity, and a transmission quality.

In an implementation, the processing unit 410 is specifically configured to:
- activate a data duplication and/or the duplication transmission in the case where the first condition is met; and/or,
- deactivate a data duplication and/or the duplication transmission in a case where the first condition is not met.

In an implementation, the processing unit 410 is further configured to: start or restart a first tinier when changing data duplication status and/or the duplication transmission or after a first time duration; or start or restart a first timer when the terminal device triggers a change of data duplication status and/or the duplication transmission or after a first time duration; where the data duplication status or a duplication transmission behavior does not change during a runtime of the first timer, or the data duplication status or a data duplication transmission behavior does not change under a certain condition during a runtime of the first tinier.

In an implementation, the processing unit 410 is further configured to: in a case of activating the data duplication and/or the duplication transmission, deactivate the data duplication and/or the duplication transmission according to a first timer, where the data duplication status or a duplication transmission behavior does not change during a runtime of the first: timer, or the data duplication status or a data duplication transmission behavior does not change under a certain condition during a runtime of the first timer.

In an implementation, the processing unit 410 is further configured to: in the case of activating the data duplication and/or the duplication transmission, start the first timer until the first timer expires, and/or, deactivate the data duplication and/or the duplication transmission when the first timer expires.

In an implementation, the processing unit 410 is specifically configured to: in the case of activating the data duplication and/or the duplication transmission, start the first timer, and before the first tinier expires, if the first condition is met again or third indication information is received, restart the first timer until the first timer expires, and/or, deactivate the data duplication and/or the duplication transmission when the first timer expires.

In an implementation, the processing unit 410 is specifically configured to: deactivate a data duplication and/or the duplication transmission in the case where the first condition is met; and/or activate a data duplication and/or the duplication transmission in a case where the first condition is not met.

In an implementation, the processing unit 410 is further configured to:
- start or restart a first timer when changing data duplication status and/or the duplication transmission or after a first time duration: or
- start or restart a first tinier when the terminal device triggers a change of data duplication status and/or the duplication transmission or after a first time duration;
- where the data duplication status or a duplication transmission behavior does not change during a runtime of the first timer, or the data duplication status or a data duplication transmission behavior does not change under a certain condition during a runtime of the first tinier.

In an implementation, the processing unit 410 is further configured to:
- in a case of deactivating the data duplication and/or the duplication transmission, activate the data duplication and/or the duplication transmission according to a first timer, where the data duplication status or a duplication transmission behavior does not change during a runtime of the first timer, or the data duplication status or a data duplication transmission behavior does not change under a certain condition during a runtime of the first timer.

In an implementation, the processing unit 410 is specifically configured to:
- in the case of deactivating the data duplication and/or the duplication transmission, start the first timer until the first timer expires, and/or, activate the data duplication and/or the duplication transmission when the first timer expires.

In an implementation, the processing unit 410 is specifically configured to:
- in the case of deactivating the data duplication and/or the duplication transmission, start the first timer, and before the first tinier expires, if the first condition is met again or third indication information is received, restart the first timer until the first timer expires, and/or, activate the data duplication and/or the duplication transmission when the first timer expires.

In an implementation, the processing unit 410 is further configured to:
- start the first timer in a case of receiving configuration information for the first tinier; or
- start the first timer at a pre-configured start occasion in a case of receiving configuration information for the first tinier: or start the first timer according to configuration information for the first timer in a case of receiving the configuration information for the first timer: or start the first timer in a case of receiving fourth indication information, wherein the fourth indication information is carried in at least one of a broadcast, RRC, a MAC CE, and DCI.

In an implementation, the first time is pre-configured or configured by a network device.

In an implementation, the terminal device 400 further includes:

a communicating unit 420, configured to send second information in a case of modifying or determining to modify a data duplication and/or the duplication transmission, where the second information is used for indicating a change of data duplication status or a duplication transmission behavior of the terminal device.

In an implementation, the second information is specifically used for indicating:

a change of the data duplication status or the duplication transmission behavior in an uplink (UL) of the terminal device; and/or, a change of the data duplication status or the duplication transmission behavior in a downlink (DE) of the terminal device; and/or, a granularity of a change of the data duplication status or the duplication transmission behavior of the terminal device is any one of per bearer, per data packet, per service, per QoS flow, and per UE, or any one of at least one bearer, at least one data packet, at least one service, at least one QoS flow, and at least one LT.

In an implementation, the communicating unit 420 is further configured to send third information, where the third information is used for indicating RLC entity information that needs to be activated or deactivated in a data duplication transmission, where the RLC entity information includes at least one of following information: an identifier of a bearer, a service identifier, a data packet identifier, QoS flow information, an identifier of an RLC entity, an identifier of a logical channel corresponding to the RLC entity, and an identifier of a MAC entity corresponding to the RLC entity.

In an implementation, the communicating unit 420 is further configured to receive fourth information, where the fourth information is used for indicating at least one of:

the data duplication status or the duplication transmission behavior of the terminal device, a data transmission behavior of the terminal device to a corresponding RLC entity, the data duplication status, and data duplication transmission information.

In an implementation, the fourth information includes at least one of:

an activation/deactivation instruction information of a duplication object, an identifier of a bearer, a service identifier, a data packet identifier, QoS flow information, an identifier of an RLC entity, an identifier of a logical channel corresponding to the RLC entity, an identifier of a PDCP entity corresponding to the RLC entity, and an identifier of a MAC entity corresponding to the RLC entity.

In an implementation, the first condition is pre-configured or configured by a network device.

In an implementation, the first condition is obtained by at least one of following manners:

a broadcast notification, an RRC message indication, a measurement configuration message indication, a reconfiguration message indication, configuration or indication from a network device when the terminal device initially accesses a cell, and acquiring in a handover command by the terminal device.

Figure 6:
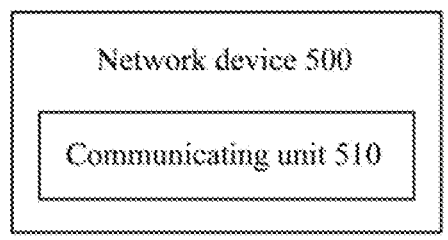
FIG. 6 is a schematic block diagram of a network device according to an embodiment of the present application.

It should be understood that the terminal device 400 according to the embodiment of the present application may correspond to the terminal device in the method embodiment of the present application, and the above-mentioned and other operations and/or functions of each unit in the terminal device 400 are respectively configured to implement a corresponding process of the terminal device in the method 200 shown in FIG. 3. For the sake of brevity, details are not repeated herein, FIG. 6 is a schematic block diagram of a network device 500 according to an embodiment of the present application. The network device 500 may be applied to a scenario where CA and DC are combined, as shown in FIG. 4, the network device 500 includes:

a communicating unit 510, configured to receive second information, where the second information is used for indicating a change of data duplication status or a duplication transmission behavior of a peer end.

In an implementation, the communicating unit 510 is further configured to receive third information from the peer end, where the third information is used for indicating RLC entity information that needs to be activated or deactivated in a duplication transmission, where the RLC entity information comprises at least one of following information: an identifier of a bearer, a service identifier, a data packet identifier, QoS flow information, an identifier of an RLC entity, an identifier of a logical channel corresponding to, the RLC entity, an identifier of a PDCP entity corresponding to the RLC entity, and an identifier of a MAC entity corresponding to the RLC entity.

In an implementation, the communicating unit 510 is further configured to send fourth information, where the fourth information is used for indicating at least one of:

the data duplication status or the duplication transmission behavior of the peer end, a data transmission behavior of the peer end to a corresponding RLC entity, the data duplication status, and data duplication transmission information.

In an implementation, the fourth information includes at least one of following information:

an activation/deactivation instruction, information of a duplication object an identifier of a bearer, a service identifier, a data packet identifier, QoS flow information, an identifier of an RLC entity, an identifier of a logical channel corresponding to the RLC entity, an identifier of a PDCP entity corresponding to the RLC entity, and an identifier of a MAC entity corresponding to the RLC entity.

In an implementation, the communicating unit 510 is further configured to send first configuration information, where the first configuration information is used for configuring a first tinier, and the first timer is used for deactivating a data duplication and/or a duplication transmission at the peer end, and/or, the first timer is used for activating a data duplication and/or a duplication transmission at the peer end.

In an implementation, communicating unit 510 is further configured to send first information, where the first information is used for configuring a trigger condition of a change of a data duplication, used for deactivating a data duplication and/or a duplication transmission, and/or, used for activating a data duplication and/or a duplication transmission.

In an implementation, the first information includes at least one of following information: a reference signal, a number of HARQ retransmissions, a number of ARQ retransmissions, a measurement object, synchronization status, a duplication object, a threshold, a service type, service status, service information to be transmitted, a trigger condition and a judgment object.

In an implementation, the first information includes at least one of following information: a reference signal, a number of HARQ retransmissions, a number of ARQ retransmissions, a measurement object, synchronization status, a duplication object, a threshold, a service type, service status, service information to be transmitted, a trigger condition, a judgment object, a priority, a channel quality, an identifier of a logical channel, a type of a logical channel, a mode of an RLC entity, an identifier of a bearer, an identifier of a carrier, an identifier of an RLC entity, an identifier of a MAC entity, and a transmission quality.

In an implementation, the duplication object includes one of a bearer, a data packet, a service, a quality of service QoS flow, and a terminal device.

In an implementation, the reference signal includes at least one of: an SSB, CSI-RS, and an SRS.

In an implementation, the measurement object includes at least one of, an RSRP, air RSRQ, an RSSI, and an SINR.

In an implementation, the service type includes at least one of a ultra-reliable and low latency communication URLLC service, an industrial Internet of Things service, an Internet of Vehicles service, a time-sensitive network carried service, a vertical industry service, and an enhanced mobile ultra-broadband eMBB service.

In an implementation, the trigger condition includes at least one of:
a measured value of the reference signal being greater than a first threshold; the measured value of the reference signal being equal to the first threshold; a number of times that the measured value of the reference signal is continuously greater than or equal to the first threshold being greater than a second threshold; the number of times that the measured value of the reference signal is continuously greater than or equal to the first threshold being equal to the second threshold; a total number of times that the measured value of the reference signal is greater than or equal to the first threshold being greater than a third threshold; the total number of times that the measured value of the reference signal is greater than or equal to the first threshold being equal to the third threshold; a number of HARQ retransmissions being greater than a fourth threshold; the number of HARQ retransmissions being equal to the fourth threshold: a number of ARQ retransmissions being greater than a fifth threshold; the number of ARQ retransmissions being equal to the fifth threshold; a number of received out-of-sync indications being greater than a sixth threshold; the number of received out-of-sync indications being equal to the sixth threshold; a change of a service pattern; start of a new service or end of a service; a traffic amount to be transmitted being less than a seventh threshold; the traffic amount to be transmitted being greater than or equal to the seventh threshold; start of a first service or end of a service; a change of a service pattern of the first service; a traffic amount of the first service to be transmitted being less than an eighth threshold; and the traffic amount of the first service to be transmitted being greater than or equal to the eighth threshold.

In an implementation, the trigger condition includes at least one of:
a measured value of the reference signal being less than a first threshold;
the measured value of the reference signal being greater than the first threshold;
the measured value of the reference signal being equal to the first threshold;
a number of times that the measured value of the reference signal is continuously less than or equal to the first threshold being greater than a second threshold;
the number of times that the measured value of the reference signal is continuously less than equal to the first threshold being equal to the second threshold;
the number of times that the measured value of the reference signal is continuously greater than or equal to the first threshold being greater than the second threshold;
the number of times that the measured value of the reference signal is continuously greater than or equal to the first threshold being equal to the second threshold;
a total number of times that the measured value of the reference signal is less than or equal to the first threshold being greater than a third threshold;
the total number of times that the measured value of the reference signal is less than or equal to the first threshold being equal to the third threshold;
the total number of times that the measured value of the reference signal is greater than or equal to the first threshold being greater than the third threshold;
the total number of times that the measured value of the reference signal is greater than or equal to the first threshold being equal to the third threshold;
a number of HARQ retransmissions being greater than a fourth threshold;
the number of HARQ retransmissions being equal to the fourth threshold;
a number of ARQ retransmissions being greater than a fifth threshold;
the number of ARQ retransmissions being equal to the fifth threshold;
a number of received out-of-sync indications being greater than a sixth threshold;
the number of received out-of-sync indications being equal to the sixth threshold;
a change of a service pattern;
start of a new service or end of a service;
a traffic volume to be transmitted being less than a seventh threshold;
the traffic volume to be transmitted being greater than or equal to the seventh threshold;
start of a first service or end of a service;
a change of a service pattern of the first service;
a traffic volume of the first service to be transmitted being less than an eighth threshold;
the traffic volume of the first service to be transmitted being greater than or equal to the eighth threshold;
a carrier priority being greater than or equal to a eleventh threshold;
the carrier priority being less than the eleventh threshold;
an identifier of a carrier or an identifier of an RLC entity or an identifier of a MAC entity or an identifier of a logical channel or an identifier of a bearer being a specific identifier;

a priority of a logical channel being greater than or equal to a twelfth threshold; and the priority of the logical channel being less than the twelfth threshold.

In an implementation, the trigger condition is for a cell where the peer end resides and/or a neighbor cell of the cell where the peer end resides and/or a configured cell; or, the first condition is for a cell to which the peer end is connected and/or a neighbor cell of the cell to which the peer end is connected and/or a configured cell.

It should be understood that, the network device 500 according to the embodiment of the present application may correspond to the network device in the method embodiment of the present application, and the above-mentioned and other operations and/or functions of each unit in the network device 500 are respectively configured to implement a corresponding process of the network device the method 300 shown in FIG. 21. For the sake of brevity, details are not repeated herein.

Figure 7:
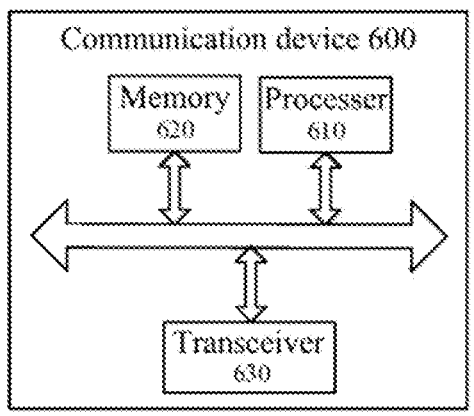
FIG. 7 is a schematic block diagram of a communication device according to an embodiment of the present application.

FIG. 7 is a schematic structural diagram of a communication device 600 provided by an embodiment of the present application. The communication device 600 shown in FIG. 7 including: a processor 610 that can call and run a computer program from a memory to implement the method according to the embodiment of the present application.

In an implementation, as shown in FIG. 7, the communication device 600 may further include a memory 620. Where the processor 610 can call and run a computer program from the memory 620 to implement the method in the embodiment of the present application.

Among them, the memory 620 may be a separate device independent of the processor 610 or integrated in the processor 610.

In an implementation, as shown in FIG. 7, the communication device 600 may further include a transceiver 630, and the processor 610 may control the transceiver 630 to communicate with other devices, specifically, it may send information or data to other devices or receive information or data sent by other devices.

Among them, the transceiver 630 may include a transmitter and a receiver. The transceiver 630 may further include antennas, and the number of antennas may be one or multiple.

In an implementation, the communication device 600 may, specifically, be a network device according to an embodiment of the present application, and the communication device 600 may implement the corresponding processes implemented h the network device in each method according to an embodiment of the present application, which will not be repeated herein for brevity.

In an implementation, the communication device 600 may, specifically, be a mobile terminal device according to an embodiment of the present application, and the communication device 600 may implement the corresponding processes implemented by the mobile terminal/terminal device in each method according to an embodiment of the present application, which will not be repeated herein for brevity.

Figure 8:
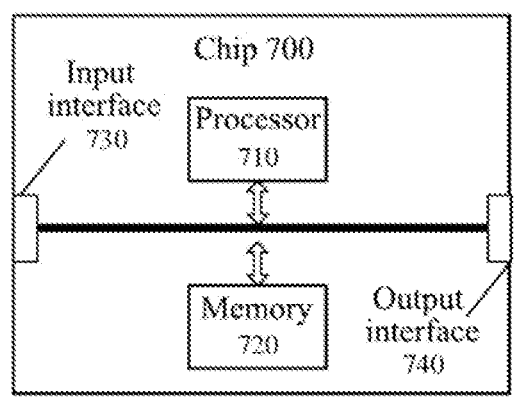
FIG. 8 is a schematic block diagram of a chip according to an embodiment of the present application.

FIG. 8 is a schematic structural diagram of a chip according to an embodiment of the present application. The chip 700 shown in FIG. 8 including: a processor 710, and the processor 710 can call and run a computer program from a memory to implement the method according to the embodiment of the present application.

In an implementation, as shown in FIG. 8, the chip 700 may further include a memory 720. Where, the processor 710 can call and run a computer program from the memory 720 to implement the method according to the embodiment of the present application.

Among them, the memory 720 may be a separate device independent of the processor 710 or integrated in the processor 710.

In an implementation, the chip 700 may further include an input interface 730. Where the processor 710 can control the input interface 730 to communicate with other devices or chips, and specifically, can obtain information or data sent by other devices or chips.

In an implementation, the chip 700 may further include an output interface 740. The processor 710 can control the output interface 740 to communicate with other devices or chips, and specifically, to output information or data to other devices or chips.

In an implementation, the chip can be applied to the network device according to the embodiment of the present application, and the Chip can implement the corresponding processes implemented by the network device in each method according to the embodiment of the present application, which will not be repeated herein for brevity.

In an implementation, the chip can be applied to the mobile terminal/terminal device according to the embodiment of the present application, and the chip can implement the corresponding processes implemented by the mobile terminal/terminal device in each method according to the embodiment of the present application, which will not be repeated herein for brevity.

It should be understood that the chip mentioned in the embodiment of the present application may also be referred to as a system-level chip, a system chip, a chip system, a system-on-chip chip or the like.

Figure 9:
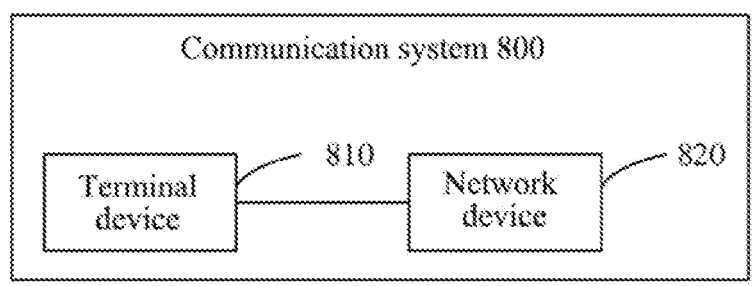
FIG. 9 is a schematic block diagram of a communication system according to an embodiment of the present application.

FIG. 9 is a schematic block diagram of a communication system 800 provided by an embodiment of the present application. As shown m FIG. 9, the communication system 800 including: a terminal device 810 and a network device 820.

Among them, the terminal device 810 can be configured to implement corresponding functions implemented by the terminal device in the above methods, and the network device 820 can be configured to implement corresponding functions implemented by the network device in the above methods, which will not be repeated herein for brevity.

It should be understood that the processor in the embodiment of the present application may be an integrated circuit chip with signal processing capabilities. In the implementation process, each step of the above method embodiment may be completed by an integrated logic circuit of hardware in the processor or instructions in the form of software. The above processor may be a general-purpose processor, a digital signal processor (DSP), an application specific integrated circuit (ASIC), a field programmable gate array (FPGA) or other programmable logic devices, discrete gates or transistor logic devices, or discrete hardware components. The disclosed methods, steps and logical block diagrams in the embodiment of the present application may be implemented or executed. The general-purpose processor may be a microprocessor or the processor may be any conventional processor or the like. The steps of the method disclosed in connection with the embodiment of the present application can be directly embodied as being executed by a hardware decoding processor or being executed by a combination of hardware and software modules in the decoding processor. The software module may be located in a storage medium that is mature in the field such as a random access memory, a flash memory, a read-only memory a programmable read-only memory or an electrically erasable programmable memory, a register. The storage medium is located in, the memory, and the processor reads the information in the memory and completes the steps in the above method in combination with its hardware.

It should be understood that the memory in the embodiment of the present application may be a volatile memory or a nonvolatile memory, or may include both the volatile and the nonvolatile memory. The nonvolatile memory may be a read-only memory (ROM), a programmable ROM (PROM), an erasable PROM (EPROM), an electrically erasable EPROM (EEPROM), or a flash memory. The volatile memory may be a random access memory (RAM), which serves as an external cache. By way example but not limitation, many forms of RAM are available, such as a static RAM (SRAM), a dynamic RAM (DRAM), a synchronous DRAM (SDRAM), a double data rate SDRAM (DDR SDRAM), enhanced SDRAM (ESDRAM), synchlink DRAM (SLDRAM) and direct rambus RAM (DR RAM). It should be noted that the memories in the systems and methods described herein are intended to include, but are not limited to, these and any other suitable types of memories.

It should be understood that the foregoing memory is an exemplary description instead of a limiting one. For example, the memory in the embodiment of the present application can also be a static RAM (SRAM), a dynamic RAM (DRAM), a synchronous DRAM (SDRAM), a double data rate SDRAM (DDR. SDRAM), an enhanced SDRAM (ESDRAM), a synch link DRAM (SLDRAM), a Direct Rambus RAM (DR RAM), etc. That is, the memory in the embodiment of the present application is intended to include, but is not limited to, these and any other suitable types of memories.

The embodiment of the present application also provides a computer-readable storage medium for storing a computer program.

In an implementation, the computer-readable storage medium can be applied to the network device in the embodiment of the present application, and the computer program enables a computer to execute the corresponding flows implemented by the network device in each method according to the embodiment of the present application, which will not be repeated herein for brevity.

In an implementation, the computer-readable storage medium can be applied to the mobile terminal/terminal device in the embodiment of the present application, and the computer program enables a computer to execute the corresponding flows implemented b the mobile terminal: terminal device in each method according to the embodiment of the present application, which will not be repeated herein for brevity.

The embodiment of the present application also provides a computer program product, including computer program instructions.

In an implementation, the computer program product can be applied to the network device according to the embodiment of the present application, and the computer program instruction enables a computer to execute the corresponding flows implemented by the network device in each method according to the embodiment of the present application, which will not be repeated herein for brevity.

In an implementation, the computer program product can be applied to the mobile terminal/terminal device according to the embodiment of the present application, and the computer program instruction enables a computer to execute the corresponding flows implemented by the mobile termi-nal/terminal device in each method according to the embodiment of the present application, which will not be repeated herein for brevity.

The embodiment of the present application also provides a computer program.

In an implementation, the computer program can be applied to the network device according to the embodiment of the present application, and when the computer program runs on a computer, it enables a computer to execute the corresponding flows implemented by the network device in each method according to the embodiment of the present application, which will not be repeated herein for brevity.

In an implementation, the computer program can be applied to the mobile terminal/terminal device according to the embodiment of the present application, and when the computer program runs on a computer, it enables a computer to execute the corresponding flows implemented by the mobile terminal/terminal device in each method according to the embodiment of the present application, which will not be repeated herein for brevity.

Persons of ordinary skill in the art will recognize that a combination of the units and algorithm steps of the examples described in the embodiments disclosed herein can be implemented in electronic hardware, or a combination of computer software and electronic hardware. Whether these functions are implemented in hardware or software depends on the specific application and design constraints of the technical solution, Professional technicians may use different methods to implement the described functions for each specific application, but such implementation should not be considered as going beyond the scope of this application.

Those skilled in the art can clearly understand that for convenience and conciseness of description, the specific working processes of the above-described systems, devices and units may refer to the corresponding processes in the above-described method embodiments and will not be repeated herein.

In several embodiments provided in the present application, it should be understood that the disclosed systems, devices and methods may be implemented in other ways. For example, the device embodiments described above are only illustrative. For example, the division of the units is only a logic function division, in actual implementation, there may be other division methods, for example, a plurality of units or components may be combined or integrated into another system, or some features may be ignored or not implemented. On the other hand, the mutual coupling or direct coupling or communication connection shown or discussed may be indirect coupling or communication connection through some interfaces, devices or units, and may be in electrical, mechanical or other forms.

The units described as separate components may or may not be physically separate, the components displayed as units may be or may not be physical units, i.e., may be located in one place or may be distributed over a plurality of network units. Some or all of the units can be selected as required to achieve the purpose of the solution of the present embodiment.

In addition, each functional unit in each embodiment of the present application may be integrated into one processing unit, each unit may exist physically separately, or two or more units may be integrated into one unit.

If the functions are implemented in the form of software functional units and sold or used as independent products, they can be stored in a computer readable storage medium. Based on this understanding, in essence, the technical solution of the present application or the part that contributes to the prior art or the part of the technical solution can be embodied in the form of a software product, which is stored in a storage medium and includes several instructions to cause a computer device (which can be a personal computer, a server, or a network device, etc.) to perform all or part of the steps of the method according to various embodiments of the present application. The above storage media include: a U disk, a removable hard disk, a read-only memory (ROM), a random access memory (RAM), a magnetic disk or an optical disk and other media that can store program codes.

The above is only a specific implementation of the present application, but the scope of protection of the present application is not limited thereto. Any person familiar with the technical field can easily think of changes or substitutions within the technical scope disclosed in the present application, and should be covered within the scope of protection of the present application, Therefore, the scope of protection of the present application shall be subject to the scope of protection of the claims.

What is claimed is:

1. A wireless communication method, applied to a scenario where carrier aggregation (CA) and dual connectivity (DC) are combined, comprising:
   in a case where a first condition is met, determining, by a terminal device, to perform a duplication transmission, and/or, determining, by the terminal device, to trigger a duplication transmission;
   determining, by the terminal device, the first condition and/or a judgment factor comprised in the first condition according to first information;
   determining, by the terminal device according to the first information, a radio link control (RLC) entity used for transmitting data in a case where the duplication transmission has been determined to be performed or triggered; and
   in a case where a second condition is met, determining, by the terminal device, whether the first condition is met;
wherein the first information comprises an identifier of the RLC entity, and the first condition comprises the identifier of the RLC entity being a specific identifier;
wherein the second condition comprises at least one of:
   periodically detecting whether the first condition is met, and a number of times that the first condition is met being greater than or equal to a ninth threshold;
   periodically detecting the judgment factor of the first condition, and the judgment factor of the first condition being greater than or equal to a tenth threshold;
   periodically detecting whether the first condition is met after receiving first indication information, and the number of times that the first condition is met being greater than or equal to the ninth threshold;
   periodically detecting the judgment factor of the first condition after receiving the first indication information, and the judgment factor of the first condition being greater than or equal to the tenth threshold;
   a change of a band width part BWP;
   network switching;
   after receiving second indication information; and
   after receiving a message comprising the first information; and
wherein the first indication information is carried in a first message, wherein the first message is one of a radio resource control (RRC) message, a media access control control element (MAC CE), and downlink control information (DCI), and is dedicated to indicate the first indication information, or, the first message is a network message comprising the first information.

2. The method of claim 1, wherein the first information further comprises at least one of following information: a reference signal, a number of hybrid automatic repeat request (HARQ) retransmissions, a number of automatic repeat request (ARQ) retransmissions, a measurement object, synchronization status, a duplication object, a threshold, a service type, service status, service information to be transmitted, a trigger condition, a judgment object, a priority, a channel quality, an identifier of a logical channel, a type of a logical channel, a mode of an RLC entity, an identifier of a bearer, an identifier of a carrier, an identifier of a media access control (MAC) entity, and a transmission quality.

3. The method of claim 1, wherein,
   a part of or all information comprised in the first information is configured or instructed by a network device; and/or,
   a part of or all information comprised in the first information is the first condition or a first factor or a first rule.

4. The method of claim 1, wherein the duplication object comprises one of: a bearer, a data packet, a service, a quality of service (QoS) flow, and a terminal device.

5. The method of claim 1, wherein the first condition further comprises at least one of:
   a measured value of the reference signal being less than a first threshold;
   the measured value of the reference signal being greater than the first threshold;
   the measured value of the reference signal being equal to the first threshold;
   a number of times that the measured value of the reference signal is continuously less than or equal to the first threshold being greater than a second threshold;
   the number of times that the measured value of the reference signal is continuously less than or equal to the first threshold being equal to the second threshold;
   the number of times that the measured value of the reference signal is continuously greater than or equal to the first threshold being greater than the second threshold;
   the number of times that the measured value of the reference signal is continuously greater than or equal to the first threshold being equal to the second threshold;
   a total number of times that the measured value of the reference signal is less than or equal to the first threshold being greater than a third threshold;
   the total number of times that the measured value of the reference signal is less than or equal to the first threshold being equal to the third threshold;
   the total number of times that the measured value of the reference signal is greater than or equal to the first threshold being greater than the third threshold;
   the total number of times that the measured value of the reference signal is greater than or equal to the first threshold being equal to the third threshold;
   a number of HARQ retransmissions being greater than a fourth threshold;
   the number of HARQ retransmissions being equal to the fourth threshold;
   a number of ARQ retransmissions being greater than a fifth threshold;
   the number of ARQ retransmissions being equal to the fifth threshold;
   a number of received out-of-sync indications being, greater than a sixth threshold;

the number of received out-of-sync indications being equal to the sixth threshold;
a change of a service pattern;
start of a new service or end of a service;
a traffic amount to be transmitted being less than a seventh threshold;
the traffic amount to be transmitted being greater than or equal to the seventh threshold;
start of a first service or end of a service;
a change of a service pattern of the first service;
a traffic amount of the first service to be transmitted being less than an eighth threshold;
the traffic amount of the first service to be transmitted being greater than or equal to the eighth threshold;
a carrier priority being greater than or equal to a eleventh threshold;
the carrier priority being less than the eleventh threshold;
an identifier of a carrier or an identifier of a MAC entity or an identifier of a logical channel or an identifier of a bearer being a specific identifier;
a priority of a logical channel being greater than or equal to a twelfth threshold; and
the priority of the logical channel being less than the twelfth threshold.

6. The method of claim 5, wherein the first condition is for a cell where the terminal device resides and/or a neighbor cell of the cell where the terminal device resides, and/or a configured cell; or, the first condition is for a cell to which the terminal device is connected and/or a neighbor cell of the cell to which the terminal device is connected and/or a configured cell.

7. The method of claim 1, wherein the in a case where a first condition is met, determining, by a terminal device, to perform a duplication transmission, and/or, determining, by the terminal device, to trigger a duplication transmission comprises:
   in the case where the first condition is met, determining, by the terminal device, to perform duplication transmission in a CA and/or DC scenario, and/or, determining, by the terminal device, to trigger duplication transmission in a CA and/or DC scenario; or,
   in the case where the first condition is met, determining, by the terminal device, to perform duplication transmission in a CA and/or DC scenario according to a configuration or an instruction of a network device, and/or determining, ley the terminal device, to trigger duplication transmission in a CA and/or DC scenario according to a configuration or an instruction of a network device.

8. The method of claim 1, wherein the method further comprises:
   in a case where the terminal device determines to perform the duplication transmission, transmitting, by a packet data convergence protocol (PDCP) entity of the terminal device, a data packet that triggers the duplication transmission to at least one RLC entity; and/or,
   in a case where the terminal device determines to perform the duplication transmission, performing, by at least one RLC entity among PDCP entities corresponding to the terminal device; data transmission and/or reception of a data packet that triggers the duplication transmission.

9. A non-transitory computer-readable storage medium, configured to store a computer program that enables a computer to execute the method of claim 1.

10. A terminal device, applied to a scenario where carrier aggregation (CA) and dual connectivity (DC) are combined, comprising:
   a processor and a memory, the memory is configured to store a computer program, the processor is configured to call and run the computer program stored in the memory to:
   in a case where a first condition is met, determine to perform a duplication transmission, and/or, determine to trigger a duplication transmission;
   determine the first condition and/or a judgment factor comprised in the first condition according to first information;
   determine, according to the first information, a radio link control (RLC) entity used for transmitting data in a case where the duplication transmission has been determined to be performed or triggered; and
   in a case where a second condition is met, determine whether the first condition is met;
wherein the first information comprises an identifier of the RLC entity, and the first condition comprises the identifier of the RLC entity being a specific identifier;
wherein the second condition comprises at least one of:
   periodically detecting whether the first condition is met, and a number of times that the first condition is met being greater than or equal to a ninth threshold;
   periodically detecting the judgment factor of the first condition, and the judgment factor of the first condition being greater than or equal to a tenth threshold;
   periodically detecting whether the first condition is met after receiving first indication information, and the number of times that the first condition is met being greater than or equal to the ninth threshold;
   periodically detecting the judgment factor of the first condition after receiving the first indication information, and the judgment factor of the first condition being greater than or equal to the tenth threshold;
   a change of a band width part BWP;
   network switching;
   after receiving second indication information; and
   after receiving a message comprising the first information; and
wherein the first indication information is carried in a first message, wherein the first message is one of a radio resource control (RRC) message, a media access control control element (MAC CE), and downlink control information (DCI), and is dedicated to indicate the first indication information, or, the first message is a network message comprising the first information.

11. The terminal device of claim 10,
   wherein the first information further comprises at least one of following information: a reference signal, a number of hybrid automatic repeat request (HARQ) retransmissions, a number of automatic repeat request (ARQ) retransmissions, a measurement object, synchronization status, a duplication object, a threshold, a service type, service status, service information to be transmitted, a trigger condition, a judgment object, a priority, a channel quality, an identifier of a logical channel, a type of a logical channel, a mode of an RLC entity, tin identifier of a bearer, an identifier of a carrier, an identifier of a media access control (MAC) entity, and a transmission quality.

* * * * *